US012756596B2

(12) United States Patent
Zewail et al.

(10) Patent No.: US 12,756,596 B2
(45) Date of Patent: Oct. 6, 2026

(54) PHASE TRACKING REFERENCE SIGNAL CONFIGURATION FOR RATE-SPLITTING MULTIPLE INPUT MULTIPLE OUTPUT COMMUNICATIONS

(71) Applicant: QUALCOMM Incorporated, San Diego, CA (US)

(72) Inventors: Ahmed Abdelaziz Ibrahim Abdelaziz Zewail, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 880 days.

(21) Appl. No.: 17/941,324

(22) Filed: Sep. 9, 2022

(65) Prior Publication Data

US 2024/0089151 A1 Mar. 14, 2024

(51) Int. Cl.
*H04L 25/02* (2006.01)
*H04W 72/20* (2023.01)
*H04W 12/02* (2009.01)

(52) U.S. Cl.
CPC ......... *H04L 25/0224* (2013.01); *H04W 72/20* (2023.01); *H04W 12/02* (2013.01)

(58) Field of Classification Search
CPC ... H04L 25/02; H04L 5/00; H04L 1/16; H04L 27/26; H04W 72/04; H04W 72/20; H04W 12/02; H04W 72/12; H04W 72/30; H04W 72/23; H04W 72/51; H04W 16/28; H04W 76/10
USPC .......................................................... 370/252
See application file for complete search history.

(56) References Cited

U.S. PATENT DOCUMENTS

| | | | | |
|---|---|---|---|---|
| 8,406,803 | B2 * | 3/2013 | Noh | H04W 72/27<br>455/448 |
| 8,976,892 | B2 * | 3/2015 | Shin | H04B 7/0434<br>375/296 |
| 9,020,515 | B2 * | 4/2015 | Choi | H04W 72/1263<br>455/450 |
| 9,319,197 | B2 * | 4/2016 | Sahin | H04L 1/0025 |
| 9,818,422 | B2 * | 11/2017 | Rose | H04N 19/30 |
| 10,951,374 | B2 * | 3/2021 | Lee | H04W 72/23 |
| 11,050,535 | B2 * | 6/2021 | Cheng | H04L 5/0051 |
| 11,296,846 | B2 * | 4/2022 | Kundargi | H04L 27/2602 |
| 11,411,619 | B2 * | 8/2022 | Liu | H04W 72/23 |
| 11,696,285 | B2 * | 7/2023 | Suh | H04W 72/23<br>370/329 |

(Continued)

*Primary Examiner* — Man U Phan
(74) *Attorney, Agent, or Firm* — Holland & Hart LLP

(57) ABSTRACT

Methods, systems, and devices for wireless communications are described. A network node may transmit a control message to one or more user equipment (UEs) that identifies that multi-user multiple input multiple output (MU-MIMO) signals from the network node include one or more private messages for a UE and one or more common messages for a UE and at least one other UE. The network node may transmit an additional control message that identifies a first phase tracking reference signal (PTRS) port for the one or more private messages and a second PTRS port for the one or more common messages, where the PTRS ports may be the same or different. Then, the network node may transmit the private messages using the first PTRS port and the common messages using the second PTRS port.

28 Claims, 18 Drawing Sheets

(56) References Cited

U.S. PATENT DOCUMENTS

| | | | | |
|---|---|---|---|---|
| 12,143,320 | B2 * | 11/2024 | Hu | H04L 5/0026 |
| 12,191,948 | B1 * | 1/2025 | Zheng | H04B 7/0456 |
| 12,244,529 | B2 * | 3/2025 | Kim | H04B 7/0413 |
| 12,323,360 | B2 * | 6/2025 | Zhang | H04W 72/0466 |
| 2022/0294590 | A1 * | 9/2022 | Gao | H04L 5/0053 |
| 2023/0421213 | A1 * | 12/2023 | Khoshnevisan | H04B 7/0413 |
| 2023/0422254 | A1 * | 12/2023 | Khoshnevisan | H04L 1/0045 |
| 2024/0022368 | A1 * | 1/2024 | Khoshnevisan | H04L 5/0044 |
| 2024/0032023 | A1 * | 1/2024 | Chen | H04B 7/0639 |
| 2024/0057140 | A1 * | 2/2024 | Sun | H04W 72/1268 |
| 2024/0089055 | A1 * | 3/2024 | Khoshnevisan | H04L 5/0094 |
| 2024/0129091 | A1 * | 4/2024 | Mei | H04W 72/232 |
| 2024/0275556 | A1 * | 8/2024 | Chen | H04W 72/232 |
| 2024/0365251 | A1 * | 10/2024 | Chen | H04W 52/42 |
| 2025/0202656 | A1 * | 6/2025 | Fan | H04W 8/24 |
| 2025/0317251 | A1 * | 10/2025 | Kim | H04L 5/0094 |

* cited by examiner

PHASE TRACKING REFERENCE SIGNAL CONFIGURATION FOR RATE-SPLITTING MULTIPLE INPUT MULTIPLE OUTPUT COMMUNICATIONS

FIELD OF TECHNOLOGY

The present disclosure relates to wireless communications, including phase tracking reference signal (PTRS) configuration for rate-splitting multiple input multiple output (MIMO) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support phase tracking reference signal (PTRS) configuration for rate-splitting multiple input multiple output (MIMO) communications. For example, the described techniques provide for a network node, which may also be referred to as a network entity, to transmit control signaling to one or more user equipment (UEs) that identifies a PTRS port for a private message of a rate-split message, and another PTRS port for a common message of a rate-split message. For example, the network node may indicate that multi-user MIMO (MU-MIMO) signals include private messages for a UE and common messages for a UE and another UE. The network node may identify a PTRS signal port for the private messages and another PTRS port for the common messages, where the PTRS port for the common messages may be shared between UEs. In some cases, the UE may receive the private messages using the PTRS port for the private messages and the common messages using the PTRS port for the common messages.

A method for wireless communication at a UE is described. The method may include receiving, from a network entity, a first control message identifying that MU-MIMO signals from the network entity include one or more private messages for the UE and one or more common messages for the UE and at least one second UE, receiving a second control message that identifies a first PTRS port for the one or more private messages and a second PTRS port for the one or more common messages, and receiving the one or more private messages using the first PTRS port and the one or more common messages using the second PTRS port.

An apparatus for wireless communication at a UE is described. The apparatus may include a processor, memory coupled with the processor, and instructions stored in the memory. The instructions may be executable by the processor to cause the apparatus to receive, from a network entity, a first control message identifying that MU-MIMO signals from the network entity include one or more private messages for the UE and one or more common messages for the UE and at least one second UE, receive a second control message that identifies a first PTRS port for the one or more private messages and a second PTRS port for the one or more common messages, and receive the one or more private messages using the first PTRS port and the one or more common messages using the second PTRS port.

Another apparatus for wireless communication at a UE is described. The apparatus may include means for receiving, from a network entity, a first control message identifying that MU-MIMO signals from the network entity include one or more private messages for the UE and one or more common messages for the UE and at least one second UE, means for receiving a second control message that identifies a first PTRS port for the one or more private messages and a second PTRS port for the one or more common messages, and means for receiving the one or more private messages using the first PTRS port and the one or more common messages using the second PTRS port.

A non-transitory computer-readable medium storing code for wireless communication at a UE is described. The code may include instructions executable by a processor to receive, from a network entity, a first control message identifying that MU-MIMO signals from the network entity include one or more private messages for the UE and one or more common messages for the UE and at least one second UE, receive a second control message that identifies a first PTRS port for the one or more private messages and a second PTRS port for the one or more common messages, and receive the one or more private messages using the first PTRS port and the one or more common messages using the second PTRS port.

Some examples of the method, apparatuses, and non-transitory computer-readable medium described herein may further include operations, features, means, or instructions for receiving, with the one or more common messages, a PTRS using the second PTRS port.

Some examples of the method, apparatuses, and non-transitory computer-readable medium described herein may further include operations, features, means, or instructions for receiving, with the one or more private messages, a PTRS using the first PTRS port.

In some examples of the method, apparatuses, and non-transitory computer-readable medium described herein, receiving the second control message may include operations, features, means, or instructions for receiving an indication that the first PTRS port may be private for the UE, the second PTRS port may be to be shared between the UE and the at least one second UE, or both.

In some examples of the method, apparatuses, and non-transitory computer-readable medium described herein, receiving the second control message may include operations, features, means, or instructions for receiving an indication that the first PTRS port may be shared between the UE and the at least one second UE.

In some examples of the method, apparatuses, and non-transitory computer-readable medium described herein, a precoder associated with the one or more private messages corresponds to the UE.

In some examples of the method, apparatuses, and non-transitory computer-readable medium described herein, receiving the second control message may include operations, features, means, or instructions for receiving an indication that the first PTRS port may be associated with a lowest demodulation reference signal (DMRS) port index of a first set of multiple DMRS port indices corresponding to the one or more private messages and identifying the first PTRS port based on the lowest DMRS port index.

In some examples of the method, apparatuses, and non-transitory computer-readable medium described herein, the first set of multiple DMRS port indices corresponding to the one or more private messages may have first values that may be less than second values of a second set of multiple DMRS port indices corresponding to the one or more common messages.

Some examples of the method, apparatuses, and non-transitory computer-readable medium described herein may further include operations, features, means, or instructions for receiving a third control message indicating a PTRS density in a time-domain, a PTRS density in a frequency-domain, a resource block offset of a frequency allocation, a resource element offset of the frequency allocation, a modulation and coding scheme (MCS) of one or more PTRSs, a set of multiple resource elements for receiving the one or more PTRSs, or any combination thereof.

Some examples of the method, apparatuses, and non-transitory computer-readable medium described herein may further include operations, features, means, or instructions for receiving a third control message indicating a set of multiple resource elements scheduled for one or more PTRS transmissions to the at least one second UE and using the second PTRS port and refraining from transmitting data using the set of multiple resource elements based on receiving the third control message.

Some examples of the method, apparatuses, and non-transitory computer-readable medium described herein may further include operations, features, means, or instructions for receiving a fourth control message indicating one or more rate matching patterns based on a PTRS density in a time-domain, where the third control message includes a downlink control information (DCI) message and the fourth control message includes radio resource control (RRC) signaling and transmitting the data according to at least one rate matching pattern of the one or more rate matching patterns based on the fourth control message.

A method for wireless communication at a network entity is described. The method may include transmitting, to a set of multiple UEs including at least a first UE and a second UE, a first control message identifying that MU-MIMO signals from the network entity include one or more private messages for the first UE and one or more common messages for the first UE and at least the second UE, transmitting a second control message that identifies a first PTRS port for the one or more private messages and a second PTRS port for the one or more common messages, and transmitting the one or more private messages using the first PTRS port and the one or more common messages using the second PTRS port.

An apparatus for wireless communication at a network entity is described. The apparatus may include a processor, memory coupled with the processor, and instructions stored in the memory. The instructions may be executable by the processor to cause the apparatus to transmit, to a set of multiple UEs including at least a first UE and a second UE, a first control message identifying that MU-MIMO signals from the network entity include one or more private messages for the first UE and one or more common messages for the first UE and at least the second UE, transmit a second control message that identifies a first PTRS port for the one or more private messages and a second PTRS port for the one or more common messages, and transmit the one or more private messages using the first PTRS port and the one or more common messages using the second PTRS port.

Another apparatus for wireless communication at a network entity is described. The apparatus may include means for transmitting, to a set of multiple UEs including at least a first UE and a second UE, a first control message identifying that MU-MIMO signals from the network entity include one or more private messages for the first UE and one or more common messages for the first UE and at least the second UE, means for transmitting a second control message that identifies a first PTRS port for the one or more private messages and a second PTRS port for the one or more common messages, and means for transmitting the one or more private messages using the first PTRS port and the one or more common messages using the second PTRS port.

A non-transitory computer-readable medium storing code for wireless communication at a network entity is described. The code may include instructions executable by a processor to transmit, to a set of multiple UEs including at least a first UE and a second UE, a first control message identifying that MU-MIMO signals from the network entity include one or more private messages for the first UE and one or more common messages for the first UE and at least the second UE, transmit a second control message that identifies a first PTRS port for the one or more private messages and a second PTRS port for the one or more common messages, and transmit the one or more private messages using the first PTRS port and the one or more common messages using the second PTRS port.

Some examples of the method, apparatuses, and non-transitory computer-readable medium described herein may further include operations, features, means, or instructions for transmitting, with the one or more common messages, a PTRS to the first UE and at least the second UE using the second PTRS port.

Some examples of the method, apparatuses, and non-transitory computer-readable medium described herein may further include operations, features, means, or instructions for transmitting a third control message to at least the second UE indicating a rate matching pattern for receiving the PTRS.

In some examples of the method, apparatuses, and non-transitory computer-readable medium described herein, the one or more common messages include a data transmission associated with at least the second UE.

Some examples of the method, apparatuses, and non-transitory computer-readable medium described herein may further include operations, features, means, or instructions for transmitting, with the one or more private messages, a PTRS using the first PTRS port.

In some examples of the method, apparatuses, and non-transitory computer-readable medium described herein, transmitting the second control message may include operations, features, means, or instructions for transmitting an indication that the first PTRS port may be private for the first UE, the second PTRS port may be to be shared between the first UE and at least the second UE, or both.

In some examples of the method, apparatuses, and non-transitory computer-readable medium described herein, transmitting the second control message may include operations, features, means, or instructions for transmitting an indication that the first PTRS port may be shared between the first UE and at least the second UE.

In some examples of the method, apparatuses, and non-transitory computer-readable medium described herein, a precoder associated with the one or more private messages corresponds to the first UE.

In some examples of the method, apparatuses, and non-transitory computer-readable medium described herein, transmitting the second control message may include operations, features, means, or instructions for transmitting an indication that the first PTRS port may be associated with a lowest DMRS port index of a first set of multiple DMRS port indices corresponding to the one or more private messages.

In some examples of the method, apparatuses, and non-transitory computer-readable medium described herein, the first set of multiple DMRS port indices corresponding to the one or more private messages may have first values that may be less than second values of a second set of multiple DMRS port indices corresponding to the one or more common messages.

Some examples of the method, apparatuses, and non-transitory computer-readable medium described herein may further include operations, features, means, or instructions for transmitting a third control message indicating a PTRS density in a time-domain, a PTRS density in a frequency-domain, a resource block offset of a frequency allocation, a resource element offset of the frequency allocation, a MCS scheme of one or more PTRSs, a set of multiple resource elements for receiving the one or more PTRSs, or any combination thereof.

Some examples of the method, apparatuses, and non-transitory computer-readable medium described herein may further include operations, features, means, or instructions for transmitting a third control message indicating a set of multiple resource elements scheduled for one or more PTRS transmissions to at least the second UE and using the second PTRS port.

Some examples of the method, apparatuses, and non-transitory computer-readable medium described herein may further include operations, features, means, or instructions for transmitting a fourth control message indicating one or more rate matching patterns based on a PTRS density in a time-domain, where the third control message includes a DCI message and the fourth control message includes RRC signaling and receiving data according to at least one rate matching pattern of the one or more rate matching patterns based on the fourth control message.

DETAILED DESCRIPTION

Figure 1:
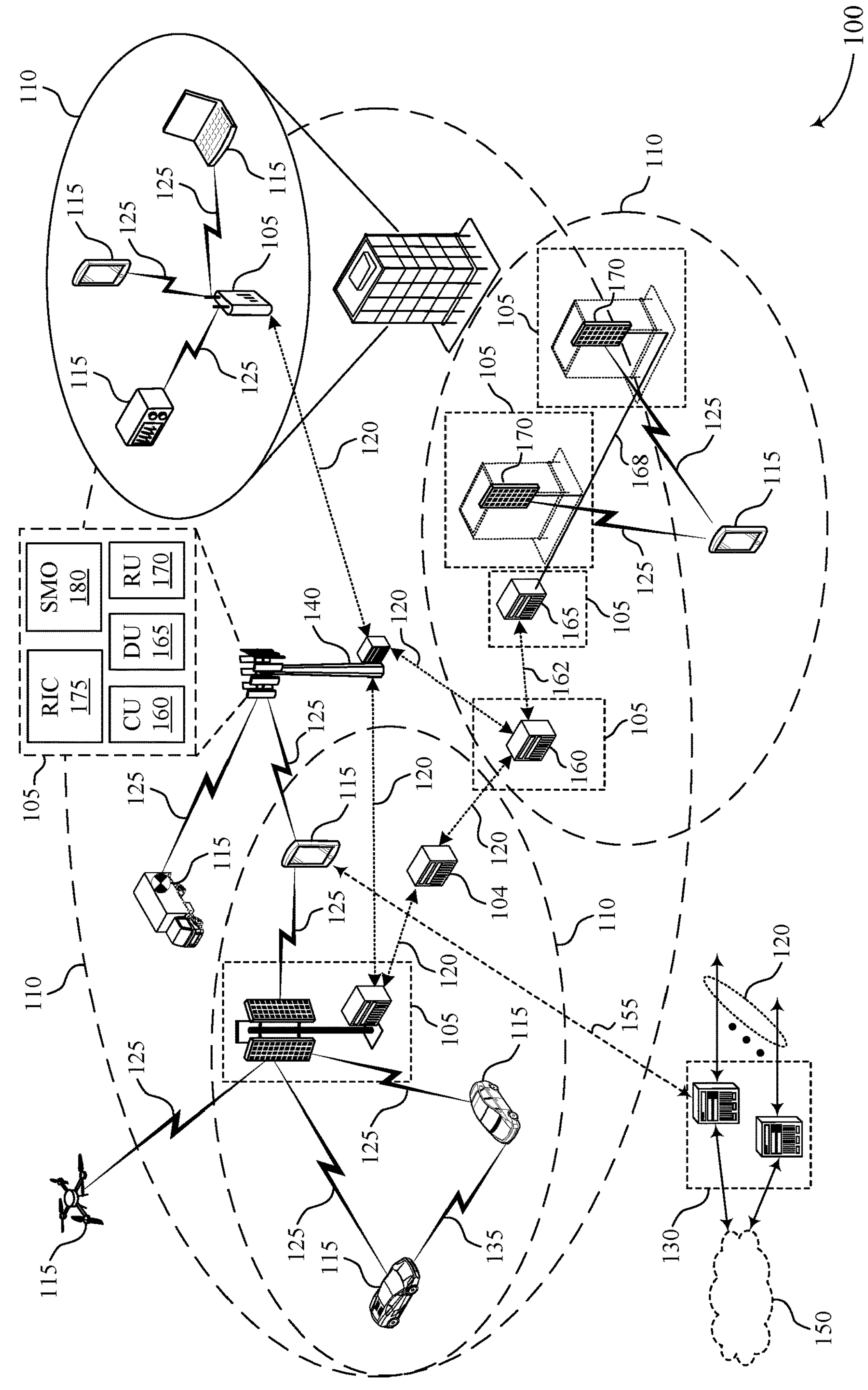
FIG. 1 illustrates an example of a wireless communications system that supports phase tracking reference signal (PTRS) configuration for rate-splitting multiple input multiple output (MIMO) communications in accordance with one or more aspects of the present disclosure.

In some wireless communications systems, one or more wireless devices (e.g., user equipment (UEs), network nodes, transmission reception points (TRPs) or the like) may communicate according to rate-splitting techniques in multi-user multiple input multiple output (MU-MIMO) communication schemes. According to such rate-splitting techniques, a message from an individual user may be split into common and private portions. A transmitting wireless device may concatenate the common portions of individual messages from different users into a common stream, while the transmitting wireless device may separately encode and modulate the private portions of the individual messages from a single user into private streams. A receiving wireless device may decode the common portion prior to decoding the private portion of an individual message. In some cases, a wireless device (e.g., a UE) may receive a configuration for transmitting and receiving one or more phase tracking reference signals (PTRS), such as a PTRS port from a demodulation reference signal (DMRS) port group for code-words (CWs), a mapping of PTRSs to resource blocks (RBs) for uplink and downlink, or the like. For rate-splitting techniques, the configuration may indicate a DMRS port that is shared between users for the common portion of the individual message and a DMRS port that is unique to the user for the private portion of the individual message, where the wireless device may determine a PTRS port for receiving or transmitting PTRSs based on a DMRS port index of the configured DMRS ports (e.g., a DMRS port with the lowest index). However, if the DMRS port index of the DMRS port for the common portion of the message has the lowest index, a wireless device (e.g., a network node, a TRP, or the like) may transmit multiple PTRSs to different UEs using the PTRS port based on the DMRS port with the lowest index, which may contradict an existing PTRS port configuration for the UE, may impair decoding of data due to rate matching errors, or the like.

As described herein, a network node may transmit a PTRS configuration to one or more UEs that indicates multiple PTRS ports for the UE to use when operating in a MU-MIMO communication scheme using rate-splitting. For example, the PTRS configuration may indicate for the UE to use a PTRS port to receive information with a common codeword (e.g., a common portion of an individual message) and a different PTRS port to receive information with a private codeword (e.g., a private portion of the individual message). In some cases, the network node may transmit the PTRSs with a common portion of the individual messages in the common stream. In some other cases, the network node may transmit the PTRSs in a private portion of the individual messages that are unique to each UE. The network node may dedicate one or more DMRS ports with smaller indices to the private portion of the individual messages, such that the DMRS port for the common portion of the individual messages may not have the lowest index.

Aspects of the disclosure are initially described in the context of wireless communications systems. Aspects of the disclosure are additionally described in the context of rate-splitting diagrams and process flows. Aspects of the disclosure are further illustrated by and described with reference to apparatus diagrams, system diagrams, and flowcharts that relate to PTRS configuration for rate-splitting MIMO communications.

FIG. 1 illustrates an example of a wireless communications system 100 that supports PTRS configuration for rate-splitting MIMO communications in accordance with one or more aspects of the present disclosure. The wireless communications system 100 may include one or more network nodes 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network nodes 105 may be dispersed throughout a geographic area to form the wireless communications system 100 and may include devices in different forms or having different capabilities. In various examples, a network node 105 may be referred to as a network element, a mobility element, a radio access network (RAN) node, or network equipment, among other nomenclature. In some examples, network nodes 105 and UEs 115 may wirelessly communicate via one or more communication links 125 (e.g., a radio frequency (RF) access link). For example, a network node 105 may support a coverage area 110 (e.g., a geographic coverage area) over which the UEs 115 and the network node 105 may establish one or more communication links 125. The coverage area 110 may be an example of a geographic area over which a network node 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network nodes 105, as shown in FIG. 1.

As described herein, a node of the wireless communications system 100, which may be referred to as a network node, or a wireless node, may be a network node 105 (e.g., any network node described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network node 105. As another example, a first node may be configured to communicate with a second node or a third node. In one aspect of this example, the first node may be a UE 115, the second node may be a network node 105, and the third node may be a UE 115. In another aspect of this example, the first node may be a UE 115, the second node may be a network node 105, and the third node may be a network node 105. In yet other aspects of this example, the first, second, and third nodes may be different relative to these examples. Similarly, reference to a UE 115, network node 105, apparatus, device, computing system, or the like may include disclosure of the UE 115, network node 105, apparatus, device, computing system, or the like being a node. For example, disclosure that a UE 115 is configured to receive information from a network node 105 also discloses that a first node is configured to receive information from a second node.

In some examples, network nodes 105 may communicate with the core network 130, or with one another, or both. For example, network nodes 105 may communicate with the core network 130 via one or more backhaul communication links 120 (e.g., in accordance with an S1, N2, N3, or other interface protocol). In some examples, network nodes 105 may communicate with one another via a backhaul communication link 120 (e.g., in accordance with an X2, Xn, or other interface protocol) either directly (e.g., directly between network nodes 105) or indirectly (e.g., via a core network 130). In some examples, network nodes 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network nodes 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network node 105 (e.g., a base station 140) may be implemented in an aggregated (e.g., monolithic, standalone) base station architecture, which may be configured to utilize a protocol stack that is physically or logically integrated within a single network node 105 (e.g., a single RAN node, such as a base station 140).

In some examples, a network node 105 may be implemented in a disaggregated architecture (e.g., a disaggregated base station architecture, a disaggregated RAN architecture), which may be configured to utilize a protocol stack that is physically or logically distributed among two or more network nodes 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network node 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network nodes 105 in a disaggregated RAN architecture may be co-located, or one or more components of the network nodes 105 may be located in distributed locations (e.g., separate physical locations). In some examples, one or more network nodes 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network nodes 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network nodes 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network node 105 (e.g., a donor base station 140). The one or more donor network nodes 105 (e.g., IAB donors) may be in communication with one or more additional network nodes 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support PTRS configuration for rate-splitting MIMO communications as described herein. For example, some operations described as being performed by a UE 115 or a network node 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network nodes 105 and the network equipment including macro eNBs or gNBs, small cell eNBs or gNBs, or relay base stations, among other examples, as shown in FIG. 1.

The UEs 115 and the network nodes 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network node 105 and other devices may refer to communication between the devices and any portion (e.g., entity, sub-entity) of a network node 105. For example, the terms "transmitting," "receiving," or "communicating," when referring to a network node 105, may refer to any portion of a network node 105 (e.g., a base station 140, a CU 160, a DU 165, a RU 170) of a RAN communicating with another device (e.g., directly or via one or more other network nodes 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network node 105 to a UE 115, uplink transmissions (e.g., return link transmissions) from a UE 115 to a network node 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network nodes 105, the UEs 115, or both) may have hardware configurations that support communications using a particular carrier bandwidth or may be configurable to support communications using one of a set of carrier bandwidths. In some examples, the wireless communications system 100 may include network nodes 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network nodes 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network node 105 may provide communication coverage via one or more cells, for example a macro cell, a small cell, a hot spot, or other types of cells, or any combination thereof. The term "cell" may refer to a logical communication entity used for communication with a network node 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network node 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network node 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network node 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network node 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network node 105. In some other examples, the overlapping coverage areas 110 associated with different technologies may be supported by different network nodes 105. The wireless communications system 100 may include, for example, a heterogeneous network in which different types of the network nodes 105 provide coverage for various coverage areas 110 using the same or different radio access technologies.

The wireless communications system 100 may support synchronous or asynchronous operation. For synchronous operation, network nodes 105 (e.g., base stations 140) may have similar frame timings, and transmissions from different network nodes 105 may be approximately aligned in time. For asynchronous operation, network nodes 105 may have different frame timings, and transmissions from different network nodes 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network node 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network node 105 (e.g., a base station 140, an RU 170), which may support aspects of such D2D communications being configured by (e.g., scheduled by) the network node 105. In some examples, one or more UEs 115 of such a group may be outside the coverage area 110 of a network node 105 or may be otherwise unable to or not configured to receive transmissions from a network node 105. In some examples, groups of the UEs 115 communicating via D2D communications may support a one-to-many (1:M) system in which each UE 115 transmits to each of the other UEs 115 in the group. In some examples, a network node 105 may facilitate the scheduling of resources for D2D communications. In some other examples, D2D communications may be carried out between the UEs 115 without an involvement of a network node 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network nodes 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network nodes 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network nodes 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network nodes 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network node 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network node 105 may be located at diverse geographic locations. A network node 105 may include an antenna array with a set of rows and columns of antenna ports that the network node 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network nodes 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network node 105 or a UE 115 may use beam sweeping techniques as part of beamforming operations. For example, a network node 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network node 105 multiple times along different directions. For example, the network node 105 may transmit a signal according to different beamforming weight sets associated with different directions of transmission. Transmissions along different beam directions may be used to identify (e.g., by a transmitting device, such as a network node 105, or by a receiving device, such as a UE 115) a beam direction for later transmission or reception by the network node 105.

Some signals, such as data signals associated with a particular receiving device, may be transmitted by transmitting device (e.g., a transmitting network node 105, a transmitting UE 115) along a single beam direction (e.g., a direction associated with the receiving device, such as a receiving network node 105 or a receiving UE 115). In some examples, the beam direction associated with transmissions along a single beam direction may be determined based on a signal that was transmitted along one or more beam directions. For example, a UE 115 may receive one or more of the signals transmitted by the network node 105 along different directions and may report to the network node 105 an indication of the signal that the UE 115 received with a highest signal quality or an otherwise acceptable signal quality.

In some examples, transmissions by a device (e.g., by a network node 105 or a UE 115) may be performed using multiple beam directions, and the device may use a combination of digital precoding or beamforming to generate a combined beam for transmission (e.g., from a network node 105 to a UE 115). The UE 115 may report feedback that indicates precoding weights for one or more beam directions, and the feedback may correspond to a configured set of beams across a system bandwidth or one or more subbands. The network node 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network node 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network node 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network node 105 or a core network 130 supporting radio bearers for user plane data. A PHY layer may map transport channels to physical channels.

The UEs 115 and the network nodes 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a network node 105 may transmit a PTRS configuration to one or more UEs 115 that indicates multiple PTRS ports for a UE 115 to use when operating in a MU-MIMO communication scheme using rate-splitting. For example, the PTRS configuration may indicate for the UE 115 to use a PTRS port to receive information with a common codeword (e.g., a common portion of an individual message) and a different PTRS port to receive information with a private codeword (e.g., a private portion of the individual message). In some cases, the network node 105 may transmit the PTRSs with a common portion of the individual messages in the common stream. In some other cases, the network node 105 may transmit the PTRSs in a private portion of the individual messages that are unique to each UE 115. The network node 105 may dedicate one or more DMRS ports with smaller indices to the private portion of the individual messages, such that the DMRS port for the common portion of the individual messages may not have the lowest index.

Figure 2:
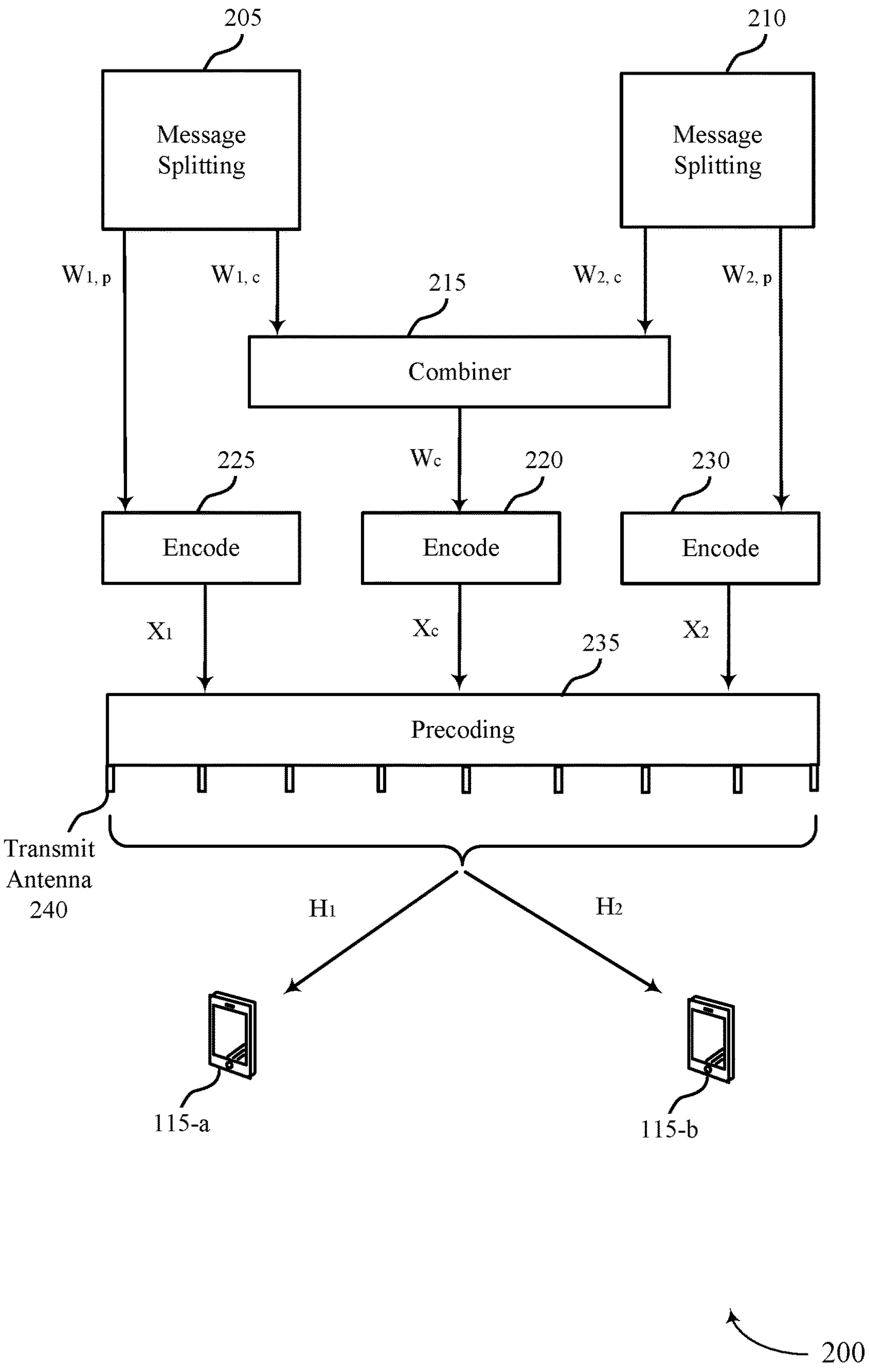
FIG. 2 illustrates an example of a rate-splitting diagram that supports PTRS configuration for rate-splitting MIMO communications in accordance with one or more aspects of the present disclosure.

FIG. 2 illustrates an example of a rate-splitting diagram 200 that supports PTRS configuration for rate-splitting MIMO communications in accordance with one or more aspects of the present disclosure. The rate-splitting diagram 200 may be implemented by aspects of the wireless communications system 100. For example, the rate-splitting diagram 200 may illustrate an example of rate-splitting techniques in which messages of an individual user may be split into a common and private portion.

In some cases, one or more wireless devices (e.g., a UE, a network node, or both) may communicate using rate-splitting techniques. For example, in MU-MIMO a network node may communicate with multiple UEs, such as UE 115-*a* and UE 115-*b*. The network node may split messages to the UEs into a common message decoded by the multiple UEs and private messages unique to each UE. In some examples, the network node may use the rate-splitting techniques for a broadcast channel to achieve a relatively high degree of freedom for transmissions, a relatively high capacity for transmissions, or both. In some cases, the common part of individual messages of two or more UEs may be concatenated, or combined, into a common message, We, encoded and modulated to obtain, $X_c$, which may be referred to as a common stream, and may have one or more layers.

For example, a network node may perform message splitting at 205 and 210, respectively, for a UE 115-*a* and a UE 115-*b*. During the message splitting, at 215, a common part of a message from the UE 115-*a*, $W_{1,c}$, may be combined with a common part of a message from the UE 115-*b*, $W_{2,c}$, to obtain $W_c$. In some cases, the network node may encode a common message at 220, a private part of the message from the UE 115-*a*, $W_{1,p}$, at 225, a private part of the message from the UE 115-*b*, $W_{2,p}$, at 230, or any combination thereof. After encoding, at 235, the network node may precode the common stream using a precoder, $P_c$, where the network node may determine $P_c$ based on pre-configured or otherwise defined values. The network node may transmit the precoded common stream using one or more transmit antennas 240. For example, one or more TRPs (e.g., in a coordinated multipoint (CoMP) scenario), a base station, or both may transmit the precoded common stream using at least one transmit antenna 240.

In some cases, the network node may encode and modulate the private part of individual messages from the UE 115-*a* and the UE 115-*b* (e.g., $W_{1,p}$ and $W_{2,p}$) separately to obtain private streams for the corresponding UEs (e.g., $X_1$ and $X_2$). The private streams may be precoded according to different precoders, such as $P_1$ and $P_2$, respectively. The network node may transmit the private streams using different transmit antennas 240 than the common stream. In some examples, the encoding at 220, 225, 230, or any combination thereof may include modulation and mapping to one or more layers in addition to encoding. The network node may transmit the precoded transmission, $H_1$, to the UE 115-*a*, which may include the common stream, the private stream, or both. Similarly, the network node may transmit the precoded transmission, $H_2$, to the UE 115-*b*, which may include the common stream, the private stream, or both.

In some cases, at the receiver side, each UE may decode the common message prior to the private message. For example, the UE 115-*a* and the UE 115-*b* may both decode the common stream. The common message (e.g., $W_c$) nay include a portion of the individual message for each UE (e.g., $W_{1,c}$ and $W_{2,c}$) (e.g., embedded in the common message), such as data intended for the individual UE. Additionally, or alternatively, the UEs may decode the common message first for successive interference cancelation to decode private messages for each UE. In some examples, the successive interference cancelation may involve UE 115-*a* estimating an effective channel corresponding to a common stream, $H_1P_c$, decoding the common message, We, and re-encoding the common stream, $X_c$. The UE 115-*a* may multiply the common stream, $X_c$, by the estimated effective channel and may subtract the result from a received signal, $Y_1$, to cancel the interference, which may provide a result, $Y_{1,p}$. That is, a UE (e.g., UE 115-*a*) may perform successive interference cancelation according to Equation 1:

$$Y_{1,p}=Y_1-\hat{H}_1P_cX_c=(H_1-\hat{H}_1)P_cX_cH_1P_1X_1+H_1P_2X_2+N_1, \quad (1)$$

where $N_1$ is an interference value, $\hat{H}_1$ is the estimated channel at the UE 115-*a*, and Equation 1 is based on a correct channel estimation and successful decoding.

In some cases, the UE 115-*a* may decode the private message using $Y_{1,p}$. Similarly, the UE 115-*b* may perform successive interference cancellation by applying Equation 1. Performing the successive interference cancellation may provide for a clean channel estimation for the common stream, which may improve reliability of the rate-splitting techniques (e.g., due to fewer decoding and reception errors of the common stream). That is, the network node, the UE 115-*a*, the UE 115-*b*, or any combination thereof may benefit from a clean channel estimation resulting in an increase in the chance of decoding the common message successfully as well as the successive interference cancelation.

In some examples, such as for a cyclic prefix (CP)-OFDM waveform, a UE and a network node may communicate using an antenna port configuration. For example, for a UE, the network node may signal a PTRS port using frequency division multiplexing (FDM) techniques. If a network node indicates the PTRS port to the UE, such as for a DMRS port group for transmission with multiple CWs, the network may indicate for the UE to use a PTRS port with a lowest DMRS port index among the DMRS ports assigned for the CW with a relatively high modulation and coding scheme (MCS). In some cases, if a MCS for multiple codewords is the same, the UE may select the codeword with a lower index (e.g., an index of 0). In some other examples, the UE may communicate with multiple TRPs in a multi-TRP system. The network node may indicate an additional number of PTRS port for the multi-TRP system, such as for a spatial division multiplexing (SDM) communication scheme.

In some examples, the network node may indicate the antenna port configuration to multiple UEs in a MU-MIMO system, and the UEs may use the indicated antenna ports to exchange uplink and downlink signaling. For example, the UEs and the network node may exchange PTRSs, which may provide for the UEs and the network node to track a phase of the transmitter and receiver. The UEs and the network node may use the PTRSs to reduce, or otherwise eliminate, phase noise and phase errors (e.g., for mmW transmissions). In some cases, the UE, the network node, or both may send the PTRSs using one DMRS port per PTRS. The network node may indicate one or more time-frequency resources, such as RBs for the PTRSs.

In some cases, the UE 115-*a*, the UE 115-*b*, or both may map one or more PTRSs to one or more RBs among the scheduled RBs for downlink and uplink. For example, the UEs may determine a RB offset, $$k_{ref}^{RB},$$

implicitly based on a UE identifier (ID) (e.g., a cell-radio network temporary identifier (C-RNTI)). In some cases, $$k_{ref}^{RB}$$

may be 0 for downlink broadcast-type traffic, if the UE supports PTRS reception. In some other cases, the UE may determine the RB offset based on a remainder of a C-RNTI and a maximum number of RBs, $$k_{max}^{RB},$$

$$\left(\text{e.g., } k_{ref}^{RB} = \text{mod}\left(C_{RNTI},\ k_{max}^{RB}\right)\right)$$

for downlink and uplink UE-specific data, where the UE 115-*a*, the UE 115-*b*, or both may determine $$k_{max}^{RB}$$

according to Equation 2:

$$k_{max}^{RB}\begin{cases} K_{PTRS}, \text{ if } \operatorname{mod}(N_{RB}, K_{PTRS}) = 0 \\ \operatorname{mod}(N_{RB}, K_{PTRS}), \text{ otherwise} \end{cases}, \tag{1}$$

where $N_{RB}$ is a number of scheduled RBs.

In some cases, the UEs may map PTRSs to a subcarrier in the RB among subcarriers used for an associated DMRS port. In some examples, a network node may indicate a resource element level offset to the UE 115-*a*, the UE 115-*b*, or both via higher layer parameters. In some other examples, for CP-OFDM in downlink and uplink, the UE 115-*a*, the UE 115-*b*, or both may implicitly determine a resource element level offset based on an index of a DMRS port that is associated with the PTRS port according to Table 1 and Table 2. In some cases, a DMRS configuration type 1 refers to the network node indicating a minimum resource element group in the frequency domain as one resource element, where a DMRS configuration type 2 may refer to the network node indicating the minimum resource element group in the frequency domain as two consecutive resource elements.

TABLE 1

Resource element level offset mapping per DMRS port for DMRS configuration type 1.

| DMRS port for DMRS configuration Type 1 | 1000 | 1001 | 1002 | 1003 |
|---|---|---|---|---|
| Resource Element Level Offset | 0 | 2 | 1 | 3 |

TABLE 2

Resource element level offset mapping per DMRS port for DMRS configuration type 2.

| | DMRS port for DMRS configuration Type 2 | | | | | |
|---|---|---|---|---|---|---|
| | 1000 | 1001 | 1002 | 1003 | 1004 | 1005 |
| Resource Element Level Offset | 0 | 1 | 2 | 3 | 4 | 5 |

In some cases, the network node may explicitly indicate the resource element level offset using a parameter in control signaling. For example, the network node may indicate a PTRS-RE-offset parameter in RRC signaling, which may be 2 bits, to explicitly indicate a resource element level offset. The resource element offset may provide for the UE 115-*a*, the UE 115-*b*, or both to avoid transmission collisions, such as for a direct current tone. The network node may include the indication of a PTRS subcarrier within a subset of subcarriers used by the associated DMRS port. If the field is absent from the control signaling, the UE 115-*a*, the UE 115-*b*, or both may apply a null value offset (e.g., the value offset 00).

In some examples, for rate-splitting MIMO, a common message may have a DMRS port that is shared between the users. For example, UE 115-*a* and UE 115-*b* may share a DMRS port with a DMRS port index to receive the common stream. The UE 115-*a*, the UE 115-*b*, or both may use the DMRS port index to determine a PTRS port to use for receiving or transmitting PTRSs. In some cases, if a common DMRS port has a lowest index, then the UE 115-*a*, the UE 115-*b*, or both may use the DMRS port for receiving or transmitting PTRSs. That is, the network node may indicate for the UE 115-*a*, the UE 115-*b*, or both to use a DMRS port with a lowest DMRS port index for communications via the common stream, such that the UE 115-*a*, the UE 115-*b*, or both also use that DMRS port for receiving or transmitting PTRSs. The UE 115-*a*, the UE 115-*b*, or both may determine a RB offset of a first PTRS tone based on a UE ID (e.g., C-RNTI), while the resource element offset is based on the UE RRC configuration or implicit mapping based on Table 1 and Table 2 (e.g., that may be configured or otherwise defined at the UEs). The PTRS time and frequency densities may be based on control signaling to the individual UEs (e.g., may be indicated by the network node and different for UE 115-*a* and UE 115-*b*).

In some cases, if the UE 115-*a* and the UE 115-*b* use the DMRS port of the common stream to receive PTRSs, a PTRS configuration may be common between the different UEs. Thus, the UE 115-*a*, the UE 115-*b*, or both may use a PTRS port based on a DMRS port of a private stream. However, some UEs may receive common messages via common streams, and may not communicate via a private stream. If such a UE is scheduled to receive or transmit one or more PTRS signals, then the UE or the network node may multiplex the PTRS signals with the common messages. If the DMRS port index of the DMRS port for the common portion of the message has the lowest index, or if one or more UEs receive common messages and not private messages, a wireless device (e.g., a network node, a TRP, or the like) may transmit multiple PTRSs to different UEs using the PTRS port based on the DMRS port with the lowest index or based on the DMRS port for the common stream, which may contradict an existing PTRS port configuration for the UE, may impair decoding of data due to rate matching errors, or the like.

Thus, the network node may transmit a PTRS configuration to the UE 115-*a*, the UE 115-*b*, or both that indicates multiple PTRS ports to use when operating in a MU-MIMO communication scheme using rate-splitting. For example, the PTRS configuration may indicate for the UE 115-*a*, the UE 115-*b*, or both to use a PTRS port to receive information with a common codeword (e.g., a common portion of an individual message) and a different PTRS port to receive information with a private codeword (e.g., a private portion of the individual message). In some cases, the network node may transmit the PTRSs with a common portion of the individual messages in the common stream. In some other cases, the network node may transmit the PTRSs in a private portion of the individual messages that are unique to each UE. The network node may dedicate one or more DMRS ports with smaller indices to the private portion of the individual messages, such that the DMRS port for the common portion of the individual messages may not have the lowest index.

Figure 3:
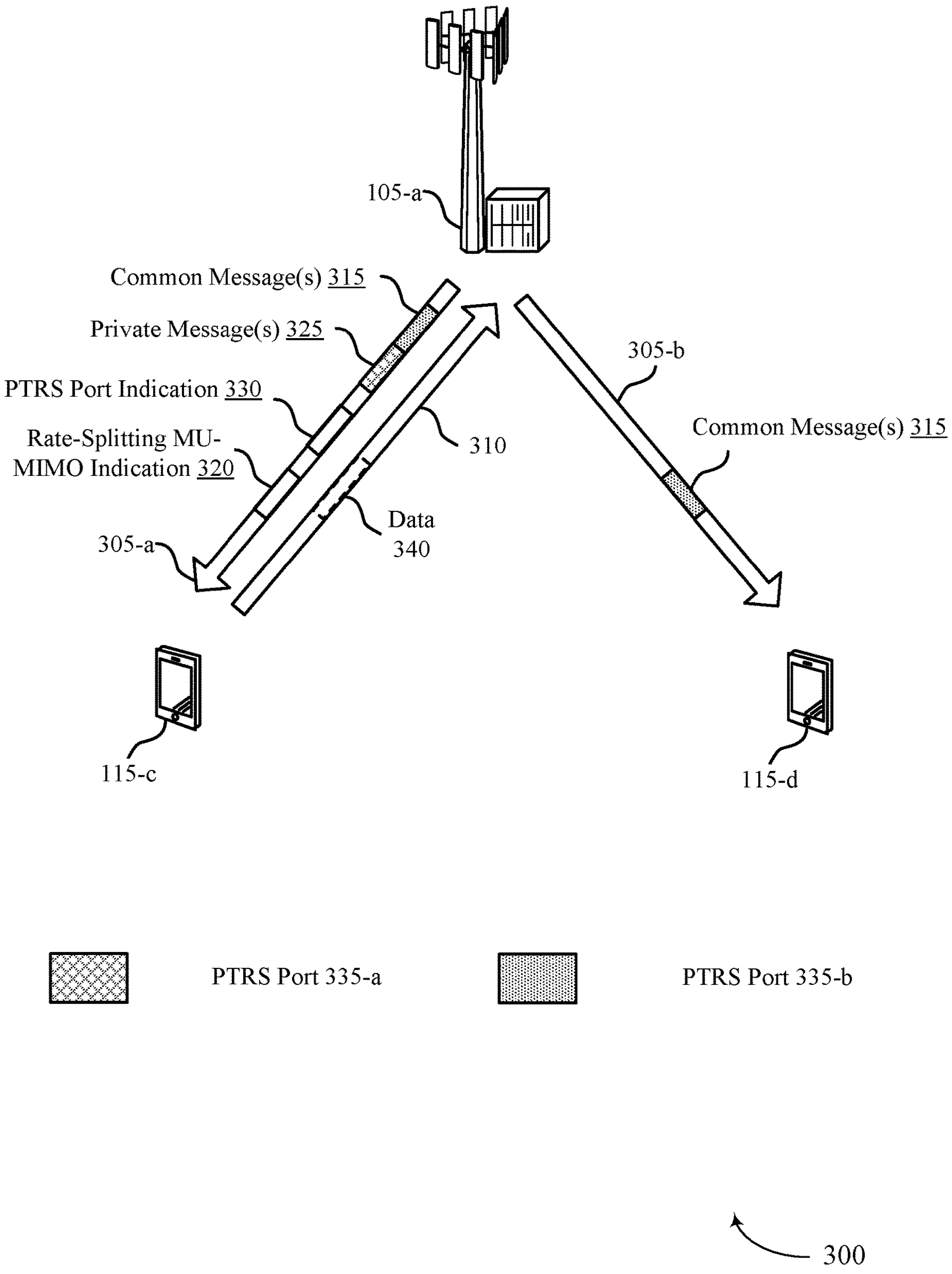
FIG. 3 illustrates an example of a wireless communications system that supports PTRS configuration for rate-splitting MIMO communications in accordance with one or more aspects of the present disclosure.

FIG. 3 illustrates an example of a wireless communications system 300 that supports PTRS configuration for rate-splitting MIMO communications in accordance with one or more aspects of the present disclosure. In some examples, the wireless communications system 300 may implement, or be implemented by, aspects of the wireless communications system 100 and the rate-splitting diagram 200. The wireless communications system 300 may include a network node 105-*a*, a UE 115-*c*, and a UE 115-*d*, which may represent examples of the network nodes 105 and the UEs 115 described with reference to FIGS. 1 and 2. In some examples, the network node 105-*a* may transmit control information, data, or both to the UE 115-*c* and the UE 115-*d* using a downlink communication link 305-*a* and a downlink communication link 305-*b*, respectively. Similarly, the UE 115-*c* may transmit control information, data, or both to the network node 105-*a* using an uplink communication link 310. For example, the network node 105-*a* may indicate multiple DMRS ports, or PTRS ports, for receiving a rate-split message to the UE 115-*c*, and may subsequently transmit one or more rate-split messages to the UE 115-*a*, the UE 115-*b*, or both.

In some examples, the network node 105-*a* may transmit one or more PTRSs to the UE 115-*c*, the UE 115-*d*, or both. Additionally, or alternatively, the UE 115-*c*, the UE 115-*d*, or both may transmit one or more PTRSs to the network node 105-*a*. The UE 115-*c* and the UE 115-*d* may use a PTRS port, or DMRS port, for receiving or transmitting the PTRSs. In some cases, the network node 105-*a* may transmit the PTRSs in a common stream of a rate-split message. That is, the network node 105-*a* may transmit a PTRS to the UE 115-*c* and the UE 115-*d* in one or more common messages 315. If the network node 105-*a* transmits the PTRSs in the common messages 315, the network node 105-*a* may indicate a same PTRS port for the PTRSs to the UE 115-*c* and the UE 115-*d*. In some other cases, the network node 105-*a* may transmit the PTRSs in a private stream of a rate-split message.

In some examples, the UE 115-*c* may receive an indication that the network node 105-*a* is transmitting MU-MIMO signals including a rate-split message. For example, the network node 105-*a* may transmit a rate-splitting MU-MIMO indication 320 that alerts the UE 115-*c* that the network node 105-*a* is to transmit the common messages 315 and one or more private messages 325. The network node 105-*a* may transmit the rate-splitting MU-MIMO indication 320 in a downlink control information (DCI) message, in RRC signaling, in a MAC-CE, or the like. In some cases, the network node 105-*a* may configure the UE 115-*c* with one or more PTRS ports to use for the common messages 315 and the private messages 325. For example, the network node 105-*a* may send a PTRS port indication 330 in control signaling, which may be the same control signaling as the rate-splitting MU-MIMO indication 320 or different control signaling (e.g., a DCI message, RRC signaling, a MAC-CE, or the like).

In some cases, the network node 105-*a* may indicate a single PTRS port is enabled for both UE 115-*c* and UE 115-*d* to send PTRSs over a private stream. The PTRS port may have a lowest DMRS port index among the DMRS ports assigned for a private codeword (e.g., for the private messages 325). Additionally, or alternatively, the network node 105-*a* may define a set of DMRS ports assigned for communications with the UE 115-*c* and the UE 115-*d*. For example, the network node 105-*a* may indicate that one or more ports of the private messages 325 come from a code division multiplexing (CDM) group with relatively small port indices compared with the ports from a CDM group to be assigned to the common messages 315. The network node 105-*a* may indicate a single PTRS port 335-*a* from the CDM group with the relatively small port indices. In some examples, the network node 105-*a* may transmit the PTRS using the PTRS port 335-*a*, which may be a port for the private messages 325. The PTRS may not be shared between the UE 115-*c* and the UE 115-*d*. That is, a precoder of the private messages 325 on a private stream for the UE 115-*c* may be different for different UEs (e.g., a precoder for the private messages 325 may be different for UE 115-*c* than one or more private messages for UE 115-*d*)

In some examples, one or more UEs in the MU-MIMO system may not have private messages 325. For example, the network node 105-*a* may not transmit private messages 325 to the UE 115-*d*. Thus, a single PTRS port 335-*a* for the private stream may be insufficient for UE 115-*d*, and the network node 105-*a* may enable multiple PTRS ports. In some examples, the network node 105-*a* may enable multiple (e.g., two) PTRS ports for a DMRS configuration type 1 or type 2, where the network node 105-*a* may use multiple CDM groups with a CDM group assigned to a common codeword for the common messages 315 and another CDM group assigned to a private codeword for the private messages 325. That is, the network node 105-*a* may indicate in the PTRS port indication 330 for the UE 115-*c* to use a PTRS port 335-*a* to receive the common messages 315 and a PTRS port 335-*b* to receive the private messages 325. The network node 105-*a* may define a PTRS configuration (e.g., via the PTRS port indication 330) for the common messages 315 to be shared between the UE 115-*c* and the UE 115-*d*. For example, the network node 105-*a* may select the PTRS port 335-*a*, and may indicate for the UE 115-*c* and the UE 115-*d* to use the PTRS port 335-*a* for the common messages 315. The network node 105-*a* may select one or more time and frequency densities based on recommendations from the UE 115-*c*, the UE 115-*d*, or both. For example, the network node 105-*a* may choose a highest density recommended by the UE 115-*c* or the UE 115-*d*.

In some cases, the RB offset of the frequency allocation may be shared between the UE 115-*c* and the UE 115-*d*, thus the RB offset may not depend on a C-RNTI. In some examples, the network node 105-*a* may determine and indicate the RB offset to be 0

$$\left(\text{e.g., } k_{ref}^{RB} = 0\right),$$

which may be the same as for downlink broadcast-type traffic. In some other examples, the network node 105-*a* may determine and indicate the RB offset based on a remainder of a parameter received in control signaling, X, and a maximum number of RBs $$\left(\text{E.g., } k_{ref}^{RB} = \text{mod}\left(X,\, k_{max}^{RB}\right)\right),$$

where X may be RRC configured, and where $$k_{max}^{RB}$$

may be based on Equation 1, as described with reference to FIG. 2. For example, a network node 105-*a* may transmit an indication of a group-RNTI (G-RNTI) for a group of UEs, including the UE 115-*c* and the UE 115-*d*, where the group of UEs is to be co-scheduled by rate-splitting. The UE 115-*c*, the UE 115-*d*, or both may determine a resource element offset based on a parameter in the PTRS port indication (e.g., an RRC parameter of the shared PTRS configuration). In some cases, the network node 105-*a* may use an MCS of the common codeword for the common messages 315 to determine the PTRS density in time. The UE 115-*c* and the UE 115-*d* may determine the PTRS density in time based on one or more thresholds indicated as a timeDensity parameter in the PTRS port indication 330. In some cases, the UE 115-*c* may use a UE-specific PTRS configuration or a shared PTRS configuration to determine a PTRS density and resource elements based on presence of a common codeword (e.g., the common message 315), which the network node 105-*a* may indicate in a control message, such as a DCI message.

In some cases, the network node 105-*a* may enable multiple (e.g., two) PTRS ports for a DMRS configuration type 2, where the network node 105-*a* may use multiple CDM groups for the private messages 325. For example, each PTRS port may have a single CDM group assigned for private messages 325, such that the PTRS port 335-*b* is assigned for the private messages 325 for the UE 115-*c*. Thus, UE 115-*c* and UE 115-*d* may not both use the PTRS port 335-*b*.

In some examples, one or more UEs in the MU-MIMIO system may receive common messages 315, but not private messages 325, such as the UE 115-*d*. That is, the network node 105-*a* may transmit data to the UE 115-*d* in the common messages 315. Thus, for UEs with single codeword, such as the UE 115-*d*, the network node 105-*a* may include one or more PTRS signals (e.g., PTRS tones) in the common stream. In some cases, the network node 105-*a* may indicate a rate matching pattern to one or more other UEs (e.g., the UE 115-*c*) indicating the locations of the PTRS tones for the UE 115-*d*, such that the network node 105-*a* and the UE 115-*c* may rate match around the PTRS tones for the UE 115-*d*. The network node 105-*a* may indicate the rate matching pattern in a different control message than the PTRS port indication 330, or in a same control message as the PTRS port indication 330. In some cases, multiple UEs with common messages 315, but not private messages 325, may share a same PTRS configuration. For example, the UE 115-*d* may share a PTRS port 335-*a* with multiple other UEs that receive the common messages 315, but not private messages 325. Additionally, or alternatively, the UE 115-*d* may use the rate matching pattern to determine the locations of the PTRS tones, where the rate matching pattern includes the PTRS tones.

In some examples, for multiple UEs with a common message, such as the common messages 315 for the UE 115-*c* and the UE 115-*d*, the UE 115-*c* and the UE 115-*d* may perform rate matching for the common messages 315. The UE 115-*c* may not use one or more resource elements occupied by one or more PTRSs for coded bits of a private codeword or common codeword if the common codeword and the private codeword are in a same downlink shared channel (e.g., a physical downlink shared channel (PDSCH)). That is, the UE 115-*c* may rate match the coded bits around the PTRSs. In some cases, UE 115-*d* may not know the resource elements occupied by the one or more PTRSs to the UE 115-*c* (e.g., if the UE 115-*c* or the network node 105-*a* does not share the PTRS configuration). Thus, the common codeword rate matching may be different for the UE 115-*d*, such that coded bits may be mapped to those resource elements causing resource collision. Additionally, or alternatively, there may be interference for the PTRS transmission across multiple co-scheduled UEs, such as the UE 115-*c* and the UE 115-*d*, if coded bits for the UE 115-*d* may be sent on the resource elements for PTRSs to the UE 115-*c*.

In some cases, to reduce or eliminate the resource collision and the interference, the network node 105-*a* may transmit control signaling (e.g., a DCI message) to the UE 115-*c*, the UE 115-*d*, or both that indicates which resource elements should or should not be used for transmitting data 340 from the UE 115-, the UE 115-*d*, or both. That is, the control signaling may indicate one or more resource elements used for the PTRSs by other co-scheduled UEs (e.g., the UE 115-*c*, the UE 115-*d*, or both). The UE 115-*d*, the UE 115-*c*, or both may perform rate matching around the resource elements indicated in the control signaling, which may address the interference and resource collision. In some cases, the network node 105-*a* may transmit additional control signaling (e.g., RRC signaling) that indicates a rate matching pattern to the UE 115-*c*, the UE 115-*d*, or both. The control signaling may identify several patterns, as the time densities of the PTRSs for different UEs may be different based on the MCS for each private codeword (e.g., for the private messages 325). The network node 105-*a* may dynamically indicate to the UE 115-*c*, the UE 115-*d*, or both which rate matching pattern to use (e.g., an existing rate matching pattern or a new rate matching pattern). In some cases, the UE 115-*c* may transmit the data 340 using the rate matching pattern and the resource elements that are available for the data 340. In some cases, for rate matching of a common codeword, the UE 115-*c*, the UE 115-*d*, or both may use PTRS resource elements if the PTRS port is for the common codeword. If the PTRS port is for a private codeword, then the PTRS resource elements may be punctured by coded bits of the common codeword.

Figure 4:
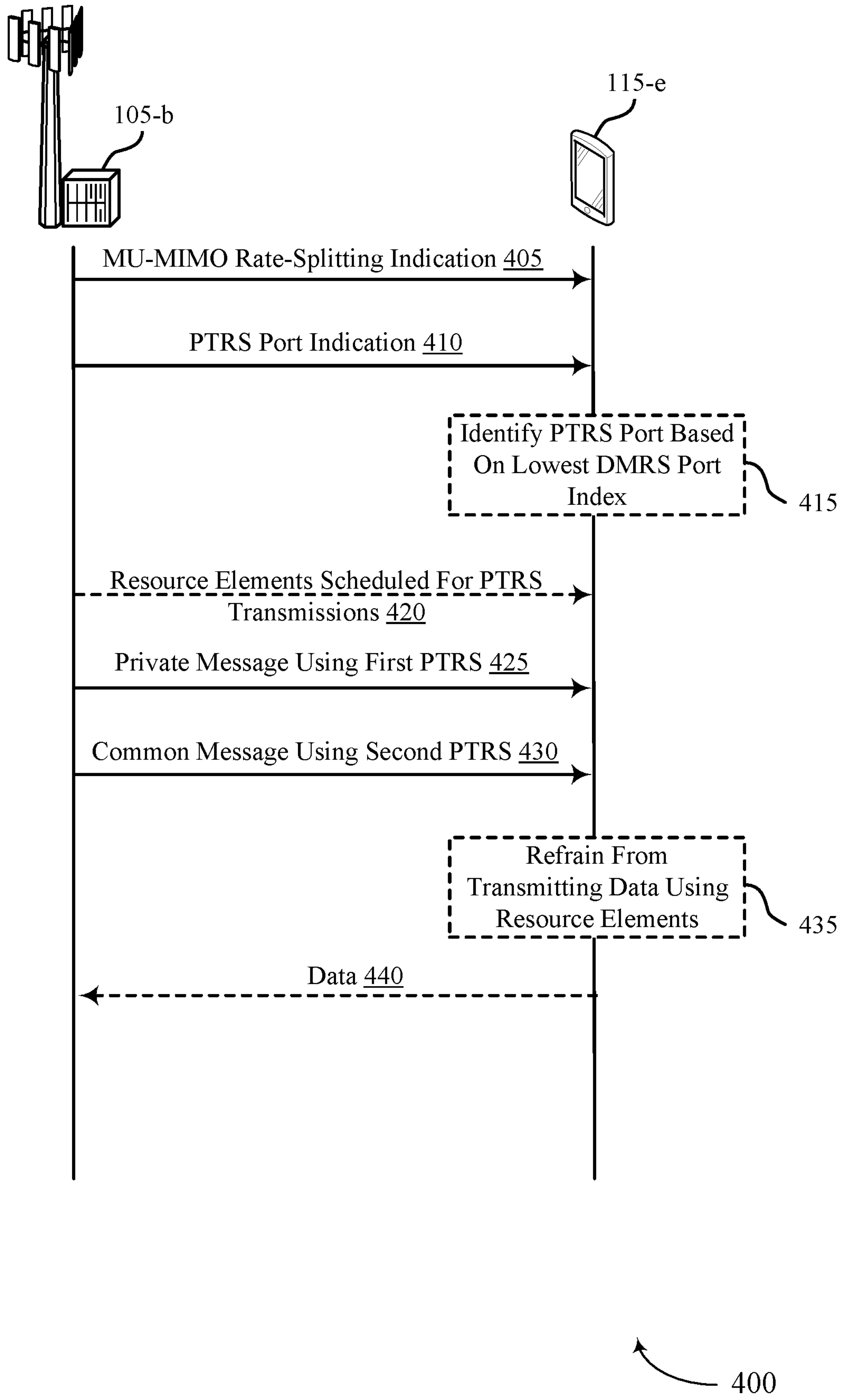
FIG. 4 illustrates an example of a process flow that supports PTRS configuration for rate-splitting MIMO communications in accordance with one or more aspects of the present disclosure.

FIG. 4 illustrates an example of a process flow 400 that supports PTRS configuration for rate-splitting MIMO communications in accordance with one or more aspects of the present disclosure. The process flow 400 may be implemented by aspects of the wireless communications system 100, the rate-splitting diagram 200, or the wireless communications system 300. For example, the process flow 400 may illustrate a network node 105-*b* transmitting control signaling indicating one or more PTRS ports to use for receiving a rate-split message at a UE 115-*e*, where the UE 115-*e* and the network node 105-*b* may be examples of corresponding devices described herein, including with reference to FIGS. 1, 2, and 3.

In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time.

At 405, the network node 105-*b* may transmit a control message identifying that MU-MIMO signals are to be split into one or more private messages for the UE 115-*e* and one or more common messages for the UE 115-*e* and one or more other UEs. The network node 105-*b* may include the control message in RRC signaling, a MAC-CE, a DCI message, or the like. The network node 105-*b* may transmit the control message to any UEs in the MU-MIMO system that are involved in the rate-splitting (e.g., receive at least the common messages).

At 410, the network node 105-*b* may transmit a control message (e.g., RRC signaling, a MAC-CE, a DCI message, or the like) with a PTRS port indication to the UE 115-*e* and, optionally, the other UEs in the MU-MIMO system involved in the rate-splitting. In some cases, the control message with the MU-MIMO rate-splitting indication may be a same control message as the PTRS port indication, or a different control message. The PTRS port indication may identify a first PTRS port for the private messages and a second PTRS port for the common messages, where the first PTRS port and the second PTRS port may be the same or different.

In some examples, the PTRS port indication may include an indication that the first PTRS port is private for the UE 115-*e*, the second PTRS port is to be shared between the UE 115-*e* and at least one other UE, or both. Additionally, or alternatively, the PTRS port indication may include an indication that the first PTRS port is shared between the UE 115-*e* and at least one other UE. In some examples, the PTRS port indication may include an indication that the first PTRS port is based on a lowest DMRS port index for DMRS ports dedicated to the one or more private messages.

At 415, the UE 115-*e* may identify the first PTRS port based on the lowest DMRS port index for the DRMS ports dedicated to the one or more private messages. The DMRS ports dedicated to the private messages may have index values that are less than index values of a DMRS ports for the one or more common messages.

At 420, the UE 115-*e* may receive a control message (e.g., a DCI message) indicating multiple resource elements scheduled for one or more PTRS transmissions to the other UE, where the UE 115-*e* may use the second PTRS port for the PTRS transmissions. In some examples, the network node 105-*b* may transmit a control message (e.g., RRC signaling) indicating one or more rate matching patterns based on a PTRS density in a time-domain.

Additionally, or alternatively, the UE 115-*e* may receive a control message indicating values for a PTRS density in a time-domain, a PTRS density in a frequency-domain, a RB offset of a frequency allocation, a resource element offset of the frequency allocation, a MCS of one or more PTRSs, resource elements for receiving the one or more PTRSs, or any combination thereof. The control message may be RRC signaling, a MAC-CE, a DCI message, or the like, and may include one or more parameters indicating the values.

At 425, the UE 115-*e* may receive the one or more private messages using the first PTRS port. In some examples, the UE 115-*e* may receive a PTRS signal with the one or more private messages and using the first PTRS port. In some cases, if the PTRS signal is with the one or more private messages, the reference signal may not be shared between the UE 115-*e* and the other UEs. A precoder of one or more private streams, such as a private stream for the UE 115-*e*, may be different for different UEs.

At 430, the UE 115-*e* may receive the one or more common messages using the second PTRS port. In some examples, the UE 115-*e* may receive a PTRS signal with the one or more common messages and using the second PTRS port.

At 435, the UE 115-*e* may refrain from transmitting data using the resource elements indicated at 420 based on receiving the control message.

At 440, the UE 115-*e* may transmit the data according to at least one rate matching pattern of the one or more rate matching patterns based on the control message indicating the rate matching patterns.

Figure 5:
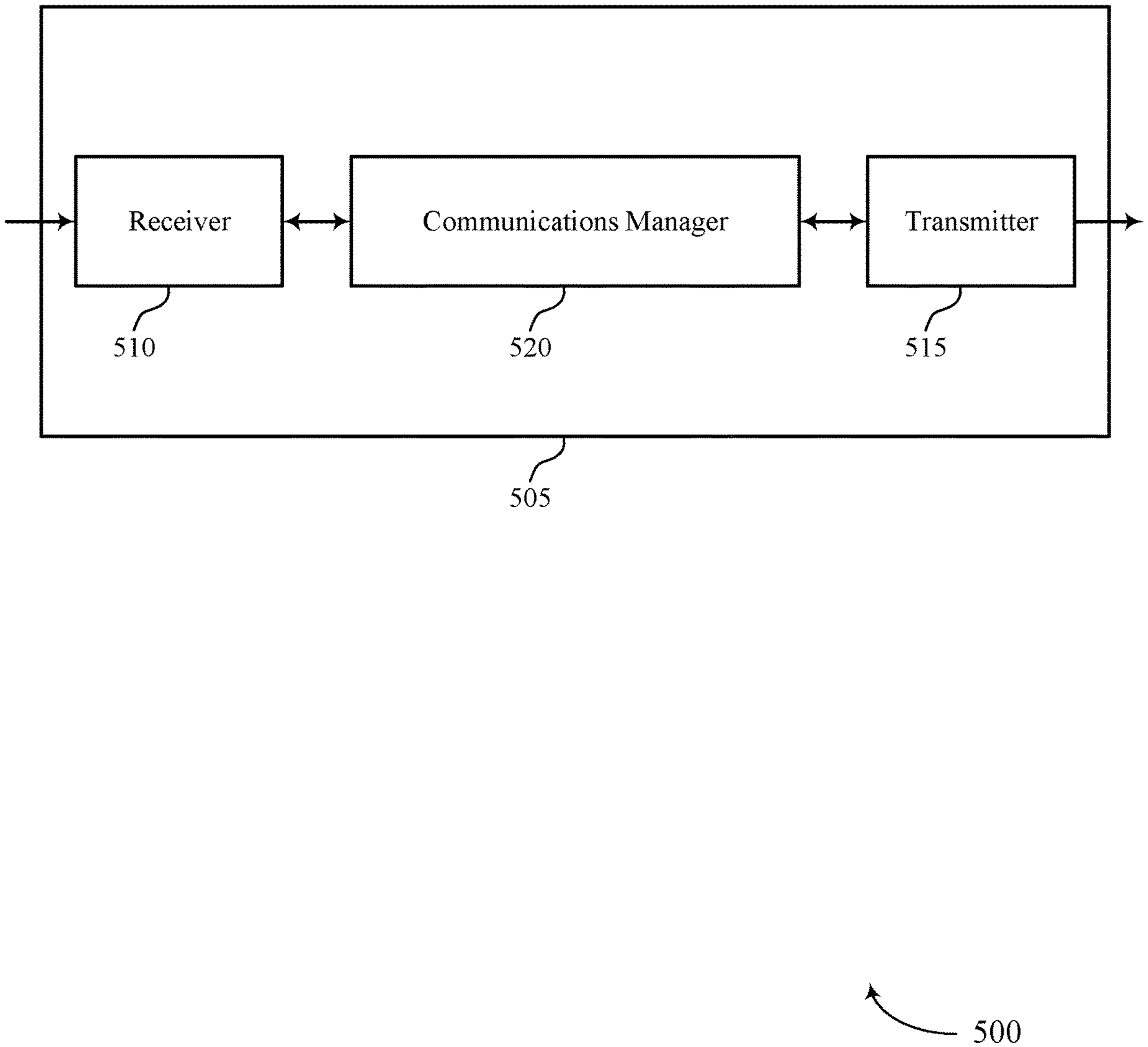
FIGS. 5 and 6 show block diagrams of devices that support PTRS configuration for rate-splitting MIMO communications in accordance with one or more aspects of the present disclosure.

FIG. 5 shows a block diagram 500 of a device 505 that supports PTRS configuration for rate-splitting MIMO communications in accordance with one or more aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the rate-splitting MIMO communications features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to PTRS configuration for rate-splitting MIMO communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to PTRS configuration for rate-splitting MIMO communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of PTRS configuration for rate-splitting MIMO communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof, may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof, may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving, from a network node, a first control message identifying that MU-MIMO signals from the network node include one or more private messages for the UE and one or more common messages for the UE and at least one second UE. The communications manager 520 may be configured as or otherwise support a means for receiving a second control message that identifies a first PTRS port for the one or more private messages and a second PTRS port for the one or more common messages. The communications manager 520 may be configured as or otherwise support a means for receiving the one or more private messages using the first PTRS port and the one or more common messages using the second PTRS port.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for a network node to transmit signaling indicating a PTRS for a UE to use to receive a private portion of a rate-splitting message and a PTRS for the UE to use to receive a common portion of the rate-splitting message, which may provide for reduced processing, reduced power consumption, more efficient utilization of communication resources, and the like.

Figure 6:
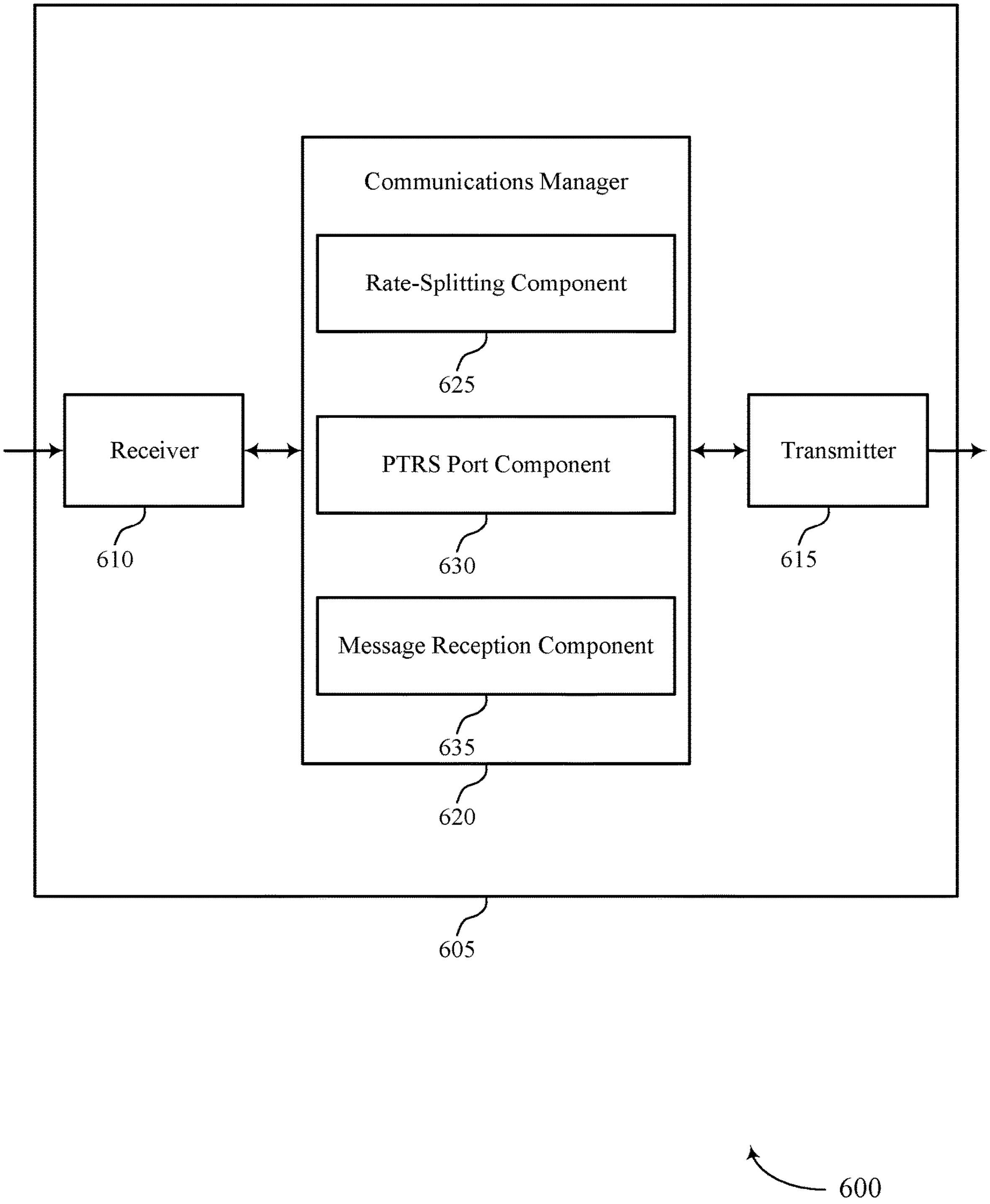

FIG. 6 shows a block diagram 600 of a device 605 that supports PTRS configuration for rate-splitting MIMO communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses). In some cases, the rate-splitting component, PTRS port component, and message reception component may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the rate-splitting component, PTRS port component, and message reception component discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device The receiver 610 may provide a means for receiving information such as packets, user data, control information, or any combination thereof associated with various information channels (e.g., control channels, data channels, information channels related to PTRS configuration for rate-splitting MIMO communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to PTRS configuration for rate-splitting MIMO communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of PTRS configuration for rate-splitting MIMO communications as described herein. For example, the communications manager 620 may include a rate-splitting component 625, an PTRS port component 630, a message reception component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The rate-splitting component 625 may be configured as or otherwise support a means for receiving, from a network node, a first control message identifying that MU-MIMO signals from the network node include one or more private messages for the UE and one or more common messages for the UE and at least one second UE. The PTRS port component 630 may be configured as or otherwise support a means for receiving a second control message that identifies a first PTRS port for the one or more private messages and a second PTRS port for the one or more common messages. The message reception component 635 may be configured as or otherwise support a means for receiving the one or more private messages using the first PTRS port and the one or more common messages using the second PTRS port.

Figure 7:
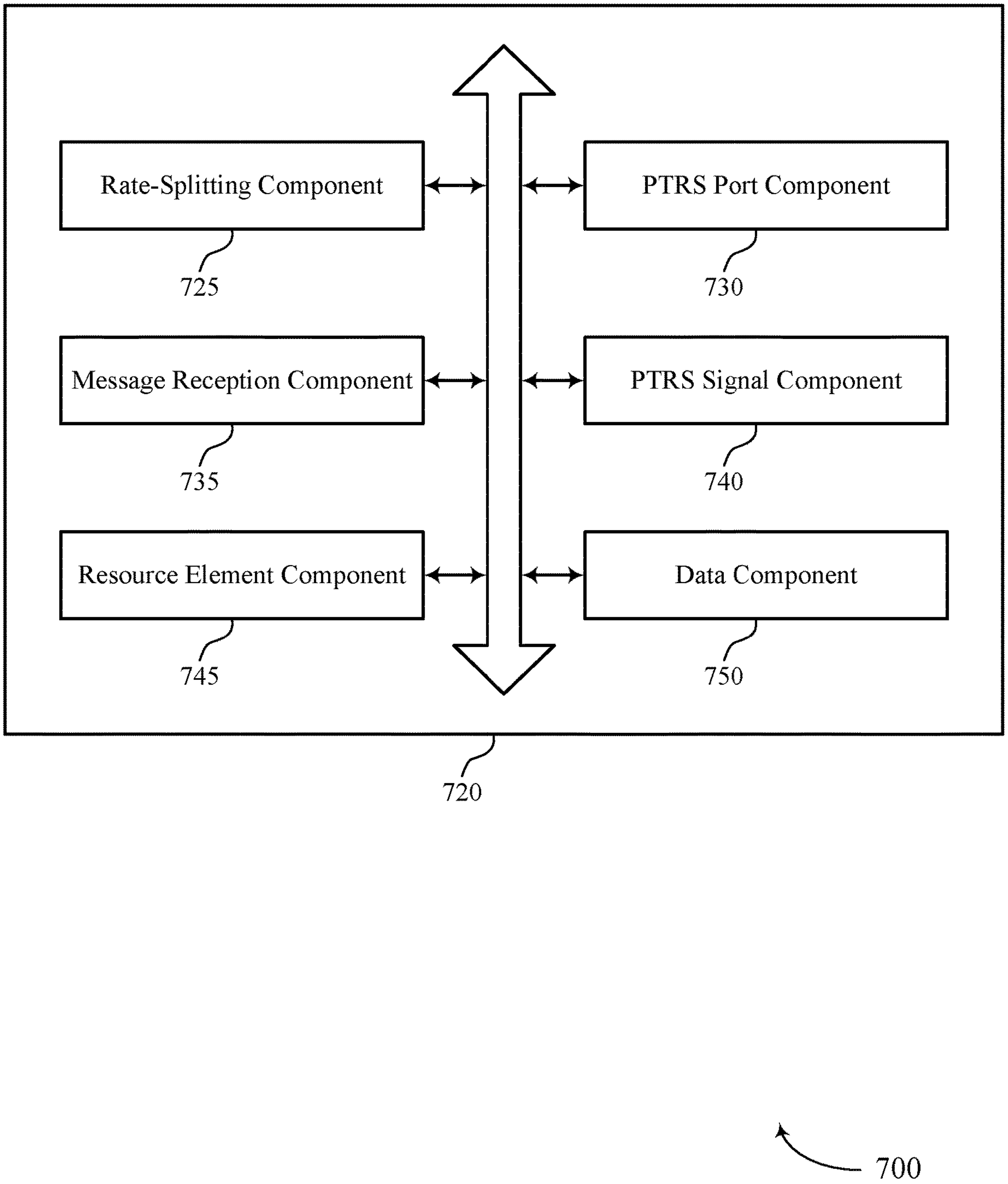
FIG. 7 shows a block diagram of a communications manager that supports PTRS configuration for rate-splitting MIMO communications in accordance with one or more aspects of the present disclosure.

FIG. 7 shows a block diagram 700 of a communications manager 720 that supports PTRS configuration for rate-splitting MIMO communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of PTRS configuration for rate-splitting MIMO communications as described herein. For example, the communications manager 720 may include a rate-splitting component 725, an PTRS port component 730, a message reception component 735, an PTRS signal component 740, a resource element component 745, a data component 750, or any combination thereof. Each of these components may communicate, directly or indirectly, with one another (e.g., via one or more buses).

The communications manager 720 may support wireless communication at a UE in accordance with examples as disclosed herein. The rate-splitting component 725 may be configured as or otherwise support a means for receiving, from a network node, a first control message identifying that MU-MIMO signals from the network node include one or more private messages for the UE and one or more common messages for the UE and at least one second UE. The PTRS port component 730 may be configured as or otherwise support a means for receiving a second control message that identifies a first PTRS port for the one or more private messages and a second PTRS port for the one or more common messages. The message reception component 735 may be configured as or otherwise support a means for receiving the one or more private messages using the first PTRS port and the one or more common messages using the second PTRS port.

In some examples, the PTRS signal component 740 may be configured as or otherwise support a means for receiving, with the one or more common messages, a PTRS using the second PTRS port.

In some examples, the PTRS signal component 740 may be configured as or otherwise support a means for receiving, with the one or more private messages, a PTRS using the first PTRS port.

In some examples, to support receiving the second control message, the PTRS port component 730 may be configured as or otherwise support a means for receiving an indication that the first PTRS port is private for the UE, the second PTRS port is to be shared between the UE and the at least one second UE, or both.

In some examples, to support receiving the second control message, the PTRS port component 730 may be configured as or otherwise support a means for receiving an indication that the first PTRS port is shared between the UE and the at least one second UE.

In some examples, a precoder associated with the one or more private messages corresponds to the UE.

In some examples, to support receiving the second control message, the PTRS port component 730 may be configured as or otherwise support a means for receiving an indication that the first PTRS port is associated with a lowest DMRS port index of a first set of multiple DMRS port indices corresponding to the one or more private messages. In some examples, to support receiving the second control message, the PTRS port component 730 may be configured as or otherwise support a means for identifying the first PTRS port based on the lowest DMRS port index.

In some examples, the first set of multiple DMRS port indices corresponding to the one or more private messages have first values that are less than second values of a second set of multiple DMRS port indices corresponding to the one or more common messages.

In some examples, the PTRS signal component 740 may be configured as or otherwise support a means for receiving a third control message indicating a PTRS density in a time-domain, a PTRS density in a frequency-domain, a RB offset of a frequency allocation, a resource element offset of the frequency allocation, an MCS of one or more PTRSs, a set of multiple resource elements for receiving the one or more PTRSs, or any combination thereof.

In some examples, the resource element component 745 may be configured as or otherwise support a means for receiving a third control message indicating a set of multiple resource elements scheduled for one or more PTRS transmissions to the at least one second UE and using the second PTRS port. In some examples, the data component 750 may be configured as or otherwise support a means for refraining from transmitting data using the set of multiple resource elements based on receiving the third control message.

In some examples, the rate-splitting component 725 may be configured as or otherwise support a means for receiving a fourth control message indicating one or more rate matching patterns based on a PTRS density in a time-domain, where the third control message includes a downlink control information message and the fourth control message includes radio resource control signaling. In some examples, the data component 750 may be configured as or otherwise support a means for transmitting the data according to at least one rate matching pattern of the one or more rate matching patterns based on the fourth control message.

In some cases, the rate-splitting component, message reception component, resource element component, PTRS port component, PTRS signal component, and data component may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the rate-splitting component, message reception component, resource element component, PTRS port component, PTRS signal component, and data component discussed herein.

Figure 8:
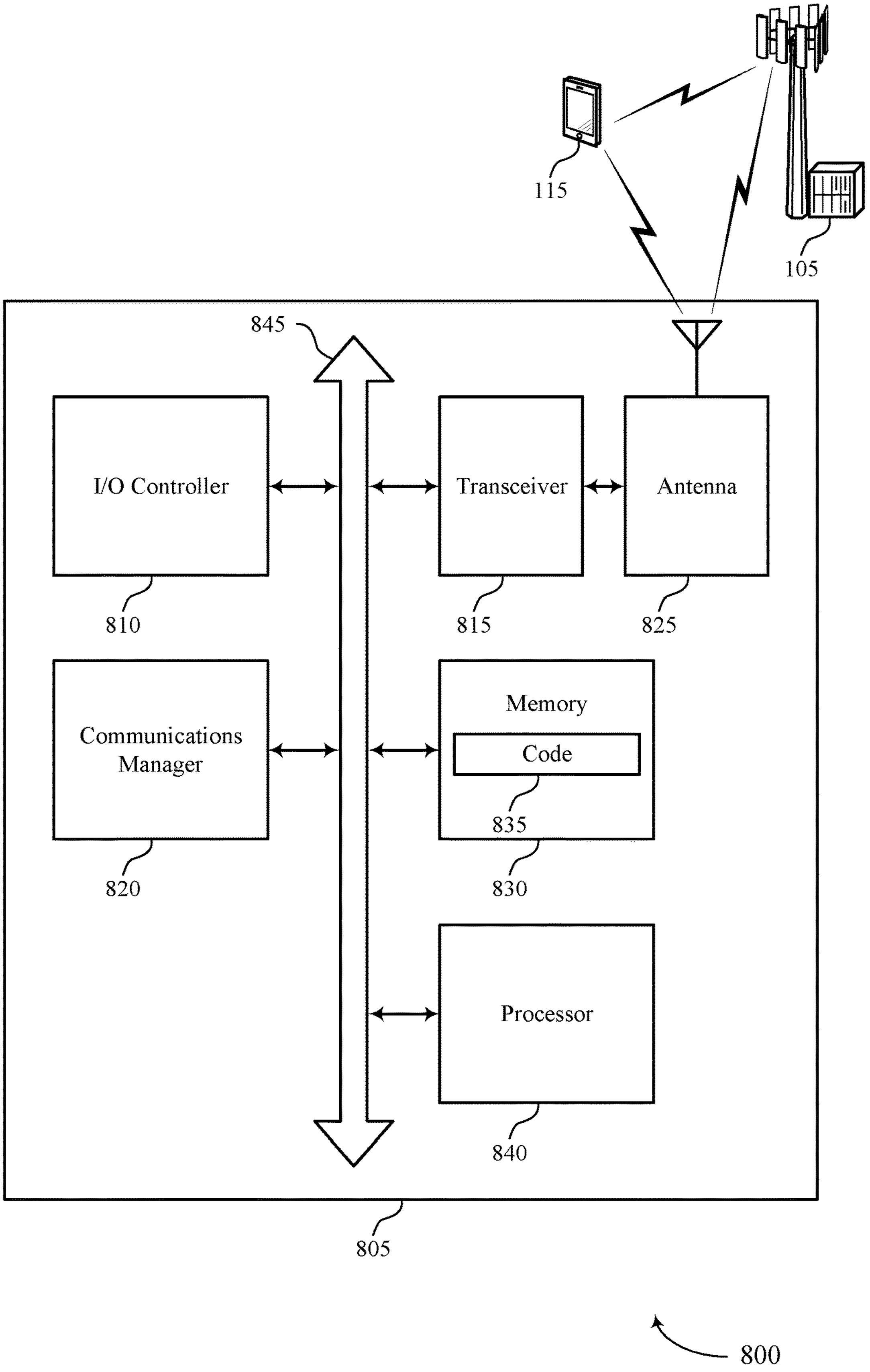
FIG. 8 shows a diagram of a system including a device that supports PTRS configuration for rate-splitting MIMO communications in accordance with one or more aspects of the present disclosure.

FIG. 8 shows a diagram of a system 800 including a device 805 that supports PTRS configuration for rate-splitting MIMO communications in accordance with one or more aspects of the present disclosure. The device 805 may be an example of or include the components of a device 505, a device 605, or a UE 115 as described herein. The device 805 may communicate (e.g., wirelessly) with one or more network nodes 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting PTRS configuration for rate-splitting MIMO communications). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a network node, a first control message identifying that MU-MIMO signals from the network node include one or more private messages for the UE and one or more common messages for the UE and at least one second UE. The communications manager 820 may be configured as or otherwise support a means for receiving a second control message that identifies a first PTRS port for the one or more private messages and a second PTRS port for the one or more common messages. The communications manager 820 may be configured as or otherwise support a means for receiving the one or more private messages using the first PTRS port and the one or more common messages using the second PTRS port.

By including or configuring the communications manager 820 in accordance with examples as described herein, the device 805 may support techniques for a network node to transmit signaling indicating a PTRS for a UE to use to receive a private portion of a rate-splitting message and a PTRS for the UE to use to receive a common portion of the rate-splitting message, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of PTRS configuration for rate-splitting MIMO communications as described herein, or the processor 840 and the memory 830 may be otherwise configured to perform or support such operations.

Figure 9:
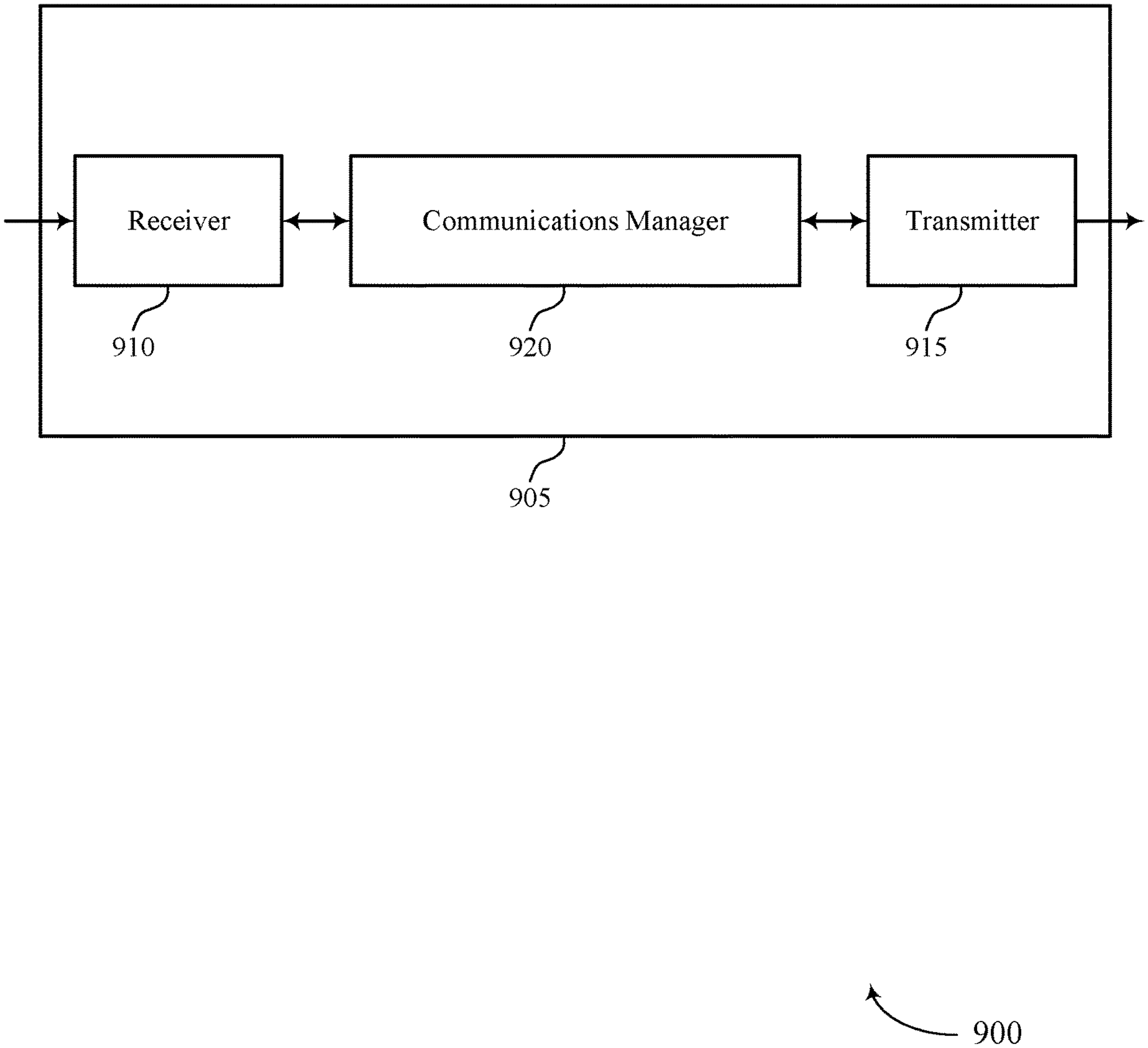
FIGS. 9 and 10 show block diagrams of devices that support PTRS configuration for rate-splitting MIMO communications in accordance with one or more aspects of the present disclosure.

FIG. 9 shows a block diagram 900 of a device 905 that supports PTRS configuration for rate-splitting MIMO communications in accordance with one or more aspects of the present disclosure. The device 905 may be an example of aspects of a network node 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of PTRS configuration for rate-splitting MIMO communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network node in accordance with examples as disclosed herein. For example, the communications manager 920 may be configured as or otherwise support a means for transmitting, to a set of multiple UEs including at least a first UE and a second UE, a first control message identifying that MU-MIMO signals from the network node include one or more private messages for the first UE and one or more common messages for the first UE and at least the second UE. The communications manager 920 may be configured as or otherwise support a means for transmitting a second control message that identifies a first PTRS port for the one or more private messages and a second PTRS port for the one or more common messages. The communications manager 920 may be configured as or otherwise support a means for transmitting the one or more private messages using the first PTRS port and the one or more common messages using the second PTRS port.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for a network node to transmit signaling indicating a PTRS for a UE to use to receive a private portion of a rate-splitting message and a PTRS for the UE to use to receive a common portion of the rate-splitting message, which may provide for reduced processing, reduced power consumption, more efficient utilization of communication resources, and the like.

Figure 10:
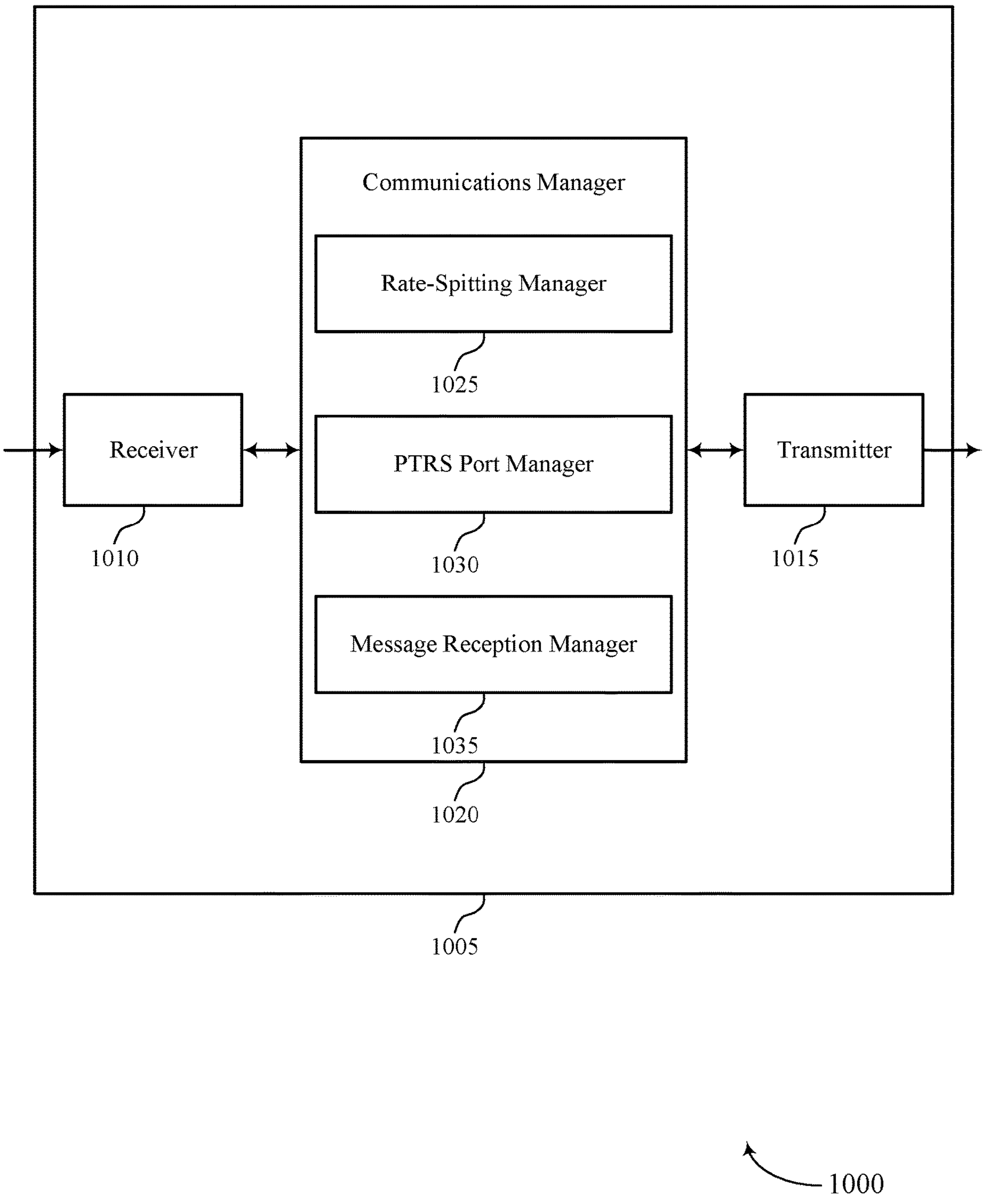

FIG. 10 shows a block diagram 1000 of a device 1005 that supports PTRS configuration for rate-splitting MIMO communications in accordance with one or more aspects of the present disclosure. The device 1005 may be an example of aspects of a device 905 or a network node 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of PTRS configuration for rate-splitting MIMO communications as described herein. For example, the communications manager 1020 may include a rate-spitting manager 1025, an PTRS port manager 1030, a message reception manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network node in accordance with examples as disclosed herein. The rate-spitting manager 1025 may be configured as or otherwise support a means for transmitting, to a set of multiple UEs including at least a first UE and a second UE, a first control message identifying that MU-MIMO signals from the network node include one or more private messages for the first UE and one or more common messages for the first UE and at least the second UE. The PTRS port manager 1030 may be configured as or otherwise support a means for transmitting a second control message that identifies a first PTRS port for the one or more private messages and a second PTRS port for the one or more common messages. The message reception manager 1035 may be configured as or otherwise support a means for transmitting the one or more private messages using the first PTRS port and the one or more common messages using the second PTRS port.

Figure 11:
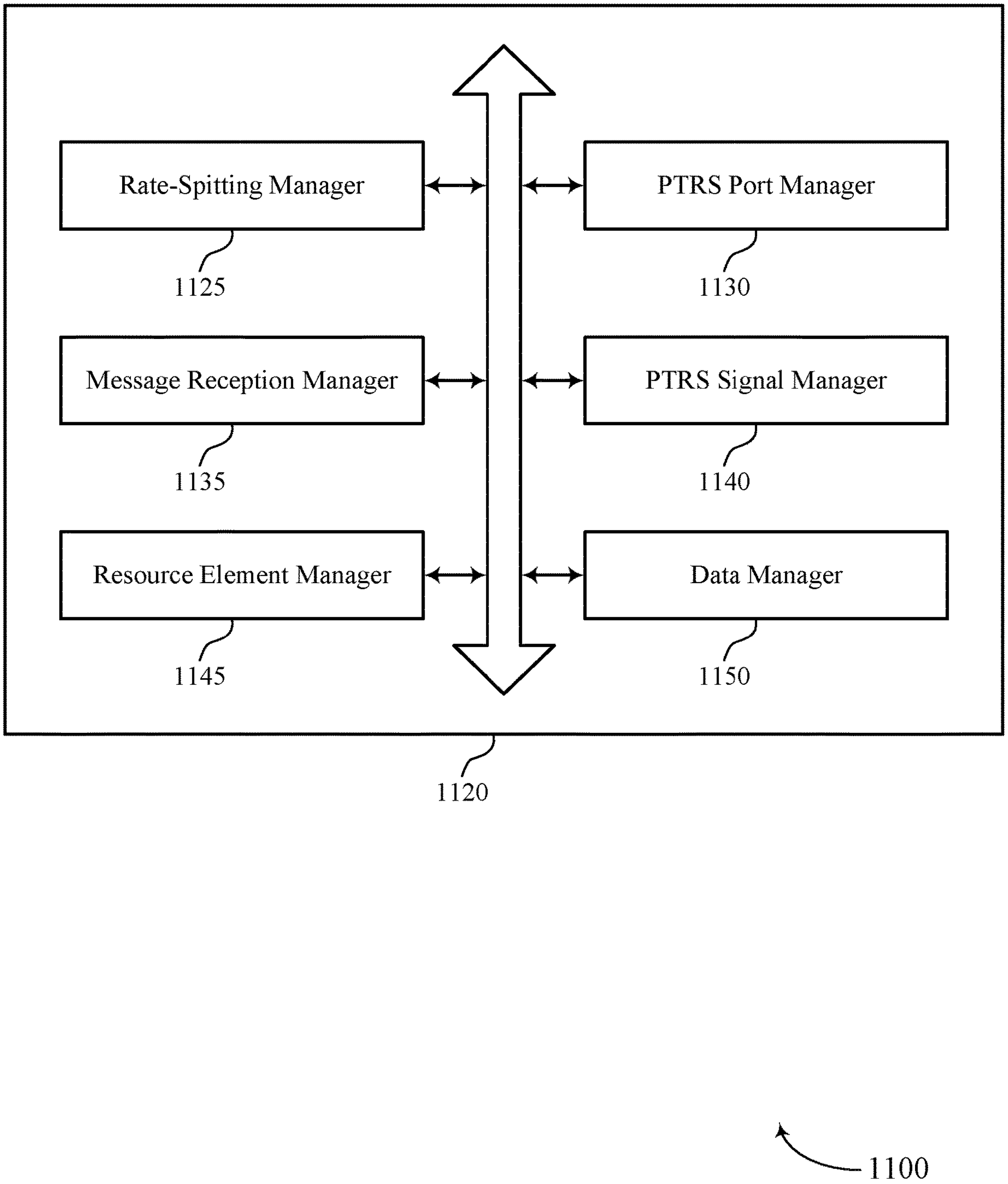
FIG. 11 shows a block diagram of a communications manager that supports PTRS configuration for rate-splitting MIMO communications in accordance with one or more aspects of the present disclosure.

FIG. 11 shows a block diagram 1100 of a communications manager 1120 that supports PTRS configuration for rate-splitting MIMO communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of PTRS configuration for rate-splitting MIMO communications as described herein. For example, the communications manager 1120 may include a rate-spitting manager 1125, an PTRS port manager 1130, a message reception manager 1135, an PTRS signal manager 1140, a resource element manager 1145, a data manager 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network node 105, between devices, components, or virtualized components associated with a network node 105), or any combination thereof.

The communications manager 1120 may support wireless communication at a network node in accordance with examples as disclosed herein. The rate-spitting manager 1125 may be configured as or otherwise support a means for transmitting, to a set of multiple UEs including at least a first UE and a second UE, a first control message identifying that MU-MIMO signals from the network node include one or more private messages for the first UE and one or more common messages for the first UE and at least the second UE. The PTRS port manager 1130 may be configured as or otherwise support a means for transmitting a second control message that identifies a first PTRS port for the one or more private messages and a second PTRS port for the one or more common messages. The message reception manager 1135 may be configured as or otherwise support a means for transmitting the one or more private messages using the first PTRS port and the one or more common messages using the second PTRS port.

In some examples, the PTRS signal manager 1140 may be configured as or otherwise support a means for transmitting, with the one or more common messages, a PTRS to the first UE and at least the second UE using the second PTRS port.

In some examples, the rate-spitting manager 1125 may be configured as or otherwise support a means for transmitting a third control message to at least the second UE indicating a rate matching pattern for receiving the PTRS.

In some examples, the one or more common messages include a data transmission associated with at least the second UE.

In some examples, the PTRS signal manager 1140 may be configured as or otherwise support a means for transmitting, with the one or more private messages, a PTRS using the first PTRS port.

In some examples, to support transmitting the second control message, the PTRS port manager 1130 may be configured as or otherwise support a means for transmitting an indication that the first PTRS port is private for the first UE, the second PTRS port is to be shared between the first UE and at least the second UE, or both.

In some examples, to support transmitting the second control message, the PTRS port manager 1130 may be configured as or otherwise support a means for transmitting an indication that the first PTRS port is shared between the first UE and at least the second UE.

In some examples, a precoder associated with the one or more private messages corresponds to the first UE.

In some examples, to support transmitting the second control message, the PTRS port manager 1130 may be configured as or otherwise support a means for transmitting an indication that the first PTRS port is associated with a lowest DMRS port index of a first set of multiple DMRS port indices corresponding to the one or more private messages.

In some examples, the first set of multiple DMRS port indices corresponding to the one or more private messages have first values that are less than second values of a second set of multiple DMRS port indices corresponding to the one or more common messages.

In some examples, the PTRS signal manager 1140 may be configured as or otherwise support a means for transmitting a third control message indicating a PTRS density in a time-domain, a PTRS density in a frequency-domain, a RB offset of a frequency allocation, a resource element offset of the frequency allocation, an MCS of one or more PTRSs, a set of multiple resource elements for receiving the one or more PTRSs, or any combination thereof.

In some examples, the resource element manager 1145 may be configured as or otherwise support a means for transmitting a third control message indicating a set of multiple resource elements scheduled for one or more PTRS transmissions to at least the second UE and using the second PTRS port.

In some examples, the rate-spitting manager 1125 may be configured as or otherwise support a means for transmitting a fourth control message indicating one or more rate matching patterns based on a PTRS density in a time-domain, where the third control message includes a downlink control information message and the fourth control message includes radio resource control signaling. In some examples, the data manager 1150 may be configured as or otherwise support a means for receiving data according to at least one rate matching pattern of the one or more rate matching patterns based on the fourth control message.

Figure 12:
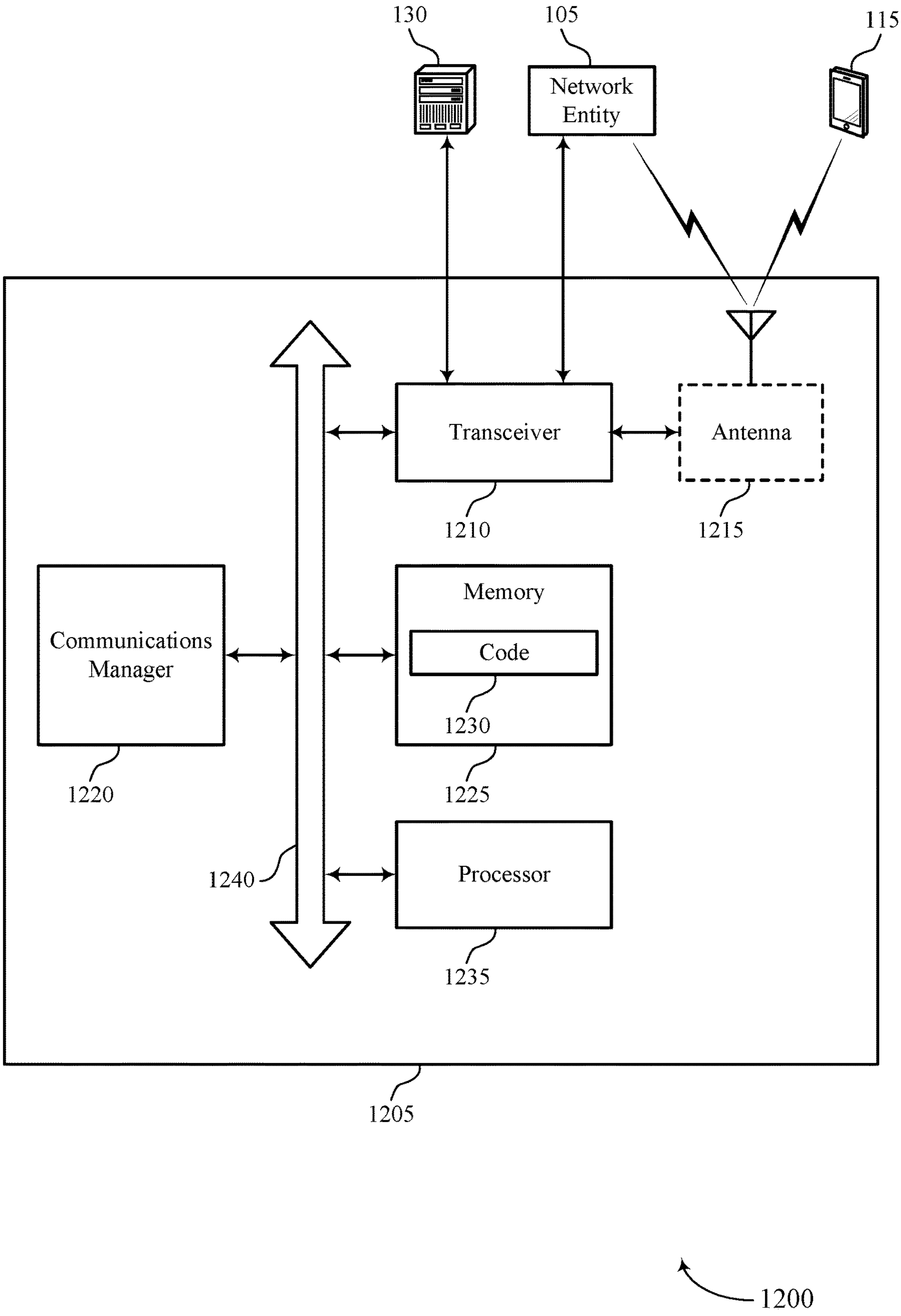
FIG. 12 shows a diagram of a system including a device that supports PTRS configuration for rate-splitting MIMO communications in accordance with one or more aspects of the present disclosure.

FIG. 12 shows a diagram of a system 1200 including a device 1205 that supports PTRS configuration for rate-splitting MIMO communications in accordance with one or more aspects of the present disclosure. The device 1205 may be an example of or include the components of a device 905, a device 1005, or a network node 105 as described herein. The device 1205 may communicate with one or more network nodes 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting PTRS configuration for rate-splitting MIMO communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network nodes 105, and may include a controller or scheduler for controlling communications with UEs 115 in cooperation with other network nodes 105. In some examples, the communications manager 1220 may support an X2 interface within an LTE/LTE-A wireless communications network technology to provide communication between network nodes 105.

The communications manager 1220 may support wireless communication at a network node in accordance with examples as disclosed herein. For example, the communications manager 1220 may be configured as or otherwise support a means for transmitting, to a set of multiple UEs including at least a first UE and a second UE, a first control message identifying that MU-MIMO signals from the network node include one or more private messages for the first UE and one or more common messages for the first UE and at least the second UE. The communications manager 1220 may be configured as or otherwise support a means for transmitting a second control message that identifies a first PTRS port for the one or more private messages and a second PTRS port for the one or more common messages. The communications manager 1220 may be configured as or otherwise support a means for transmitting the one or more private messages using the first PTRS port and the one or more common messages using the second PTRS port.

By including or configuring the communications manager 1220 in accordance with examples as described herein, the device 1205 may support techniques for a network node to transmit signaling indicating a PTRS for a UE to use to receive a private portion of a rate-splitting message and a PTRS for the UE to use to receive a common portion of the rate-splitting message, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of PTRS configuration for rate-splitting MIMO communications as described herein, or the processor 1235 and the memory 1225 may be otherwise configured to perform or support such operations.

Figure 13:
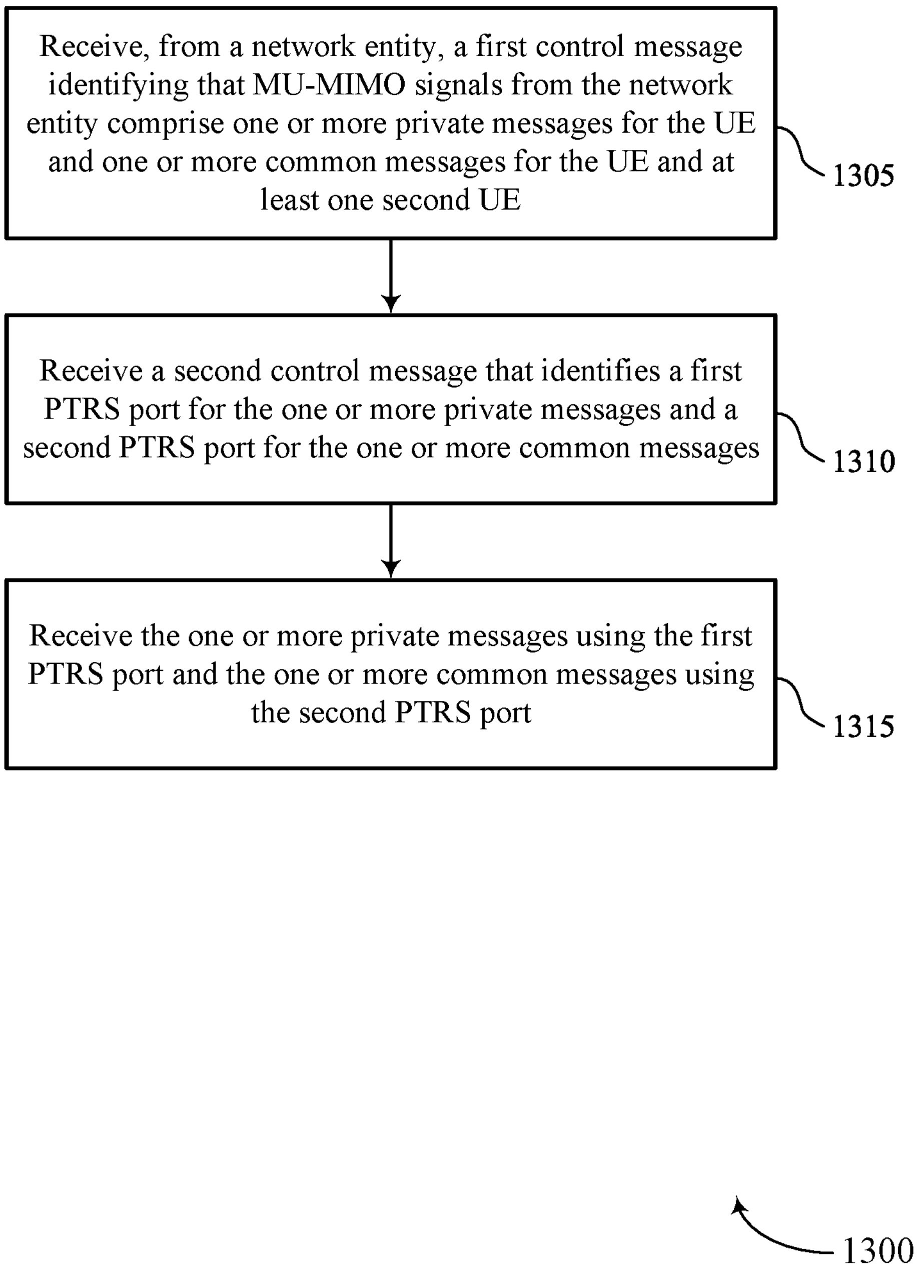
FIGS. 13 through 18 show flowcharts illustrating methods that support PTRS configuration for rate-splitting MIMO communications in accordance with one or more aspects of the present disclosure.

FIG. 13 shows a flowchart illustrating a method 1300 that supports PTRS configuration for rate-splitting MIMO communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network node, a first control message identifying that MU-MIMO signals from the network node include one or more private messages for the UE and one or more common messages for the UE and at least one second UE. The operations of 1305 may be performed in accordance with examples as disclosed herein. In some examples, aspects of the operations of 1305 may be performed by a rate-splitting component 725 as described with reference to FIG. 7.

At 1310, the method may include receiving a second control message that identifies a first PTRS port for the one or more private messages and a second PTRS port for the one or more common messages. The operations of 1310 may be performed in accordance with examples as disclosed herein. In some examples, aspects of the operations of 1310 may be performed by an PTRS port component 730 as described with reference to FIG. 7.

At 1315, the method may include receiving the one or more private messages using the first PTRS port and the one or more common messages using the second PTRS port. The operations of 1315 may be performed in accordance with examples as disclosed herein. In some examples, aspects of the operations of 1315 may be performed by a message reception component 735 as described with reference to FIG. 7.

Figure 14:
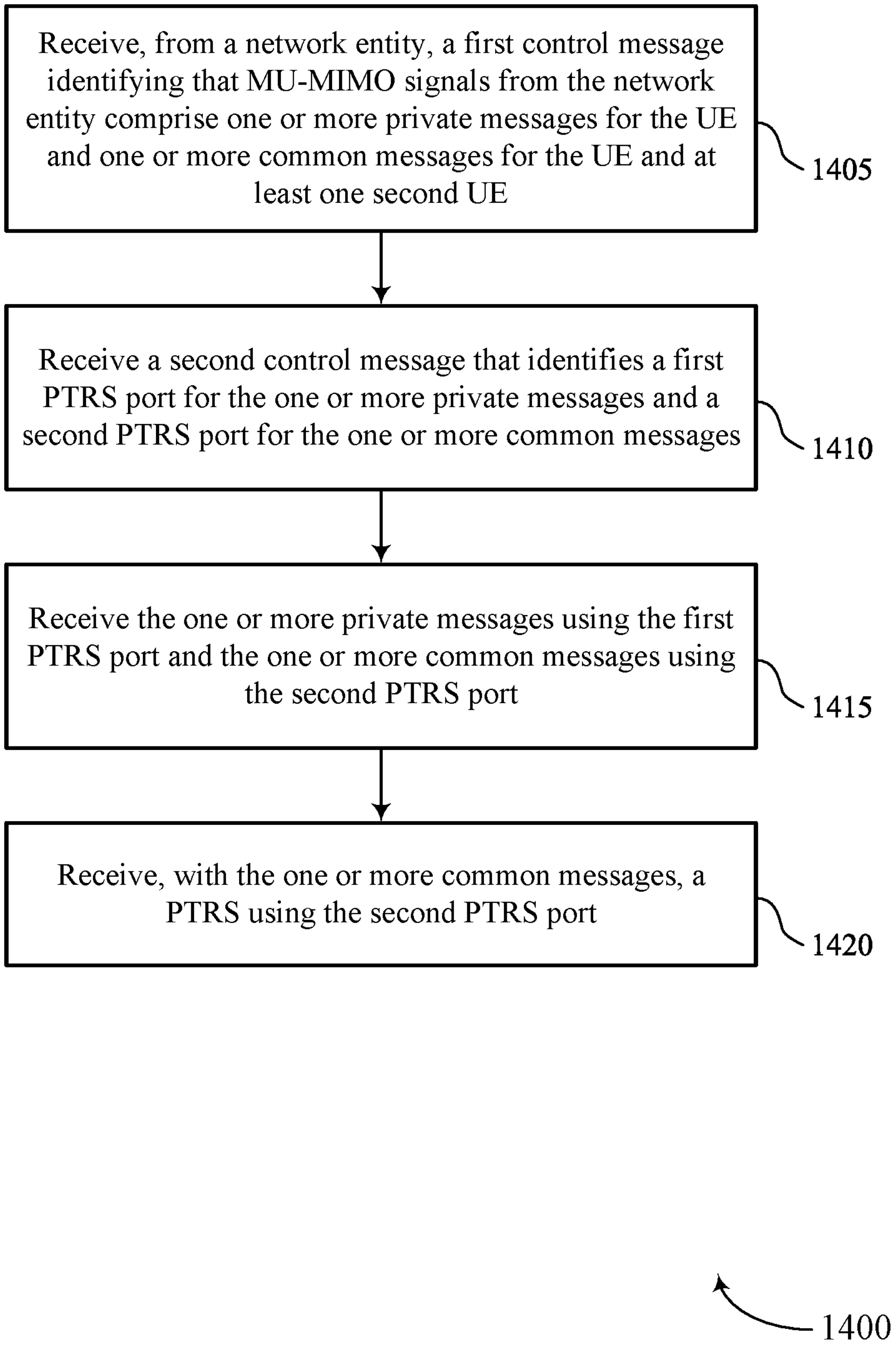

FIG. 14 shows a flowchart illustrating a method 1400 that supports PTRS configuration for rate-splitting MIMO communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network node, a first control message identifying that MU-MIMO signals from the network node include one or more private messages for the UE and one or more common messages for the UE and at least one second UE. The operations of 1405 may be performed in accordance with examples as disclosed herein. In some examples, aspects of the operations of 1405 may be performed by a rate-splitting component 725 as described with reference to FIG. 7.

At 1410, the method may include receiving a second control message that identifies a first PTRS port for the one or more private messages and a second PTRS port for the one or more common messages. The operations of 1410 may be performed in accordance with examples as disclosed herein. In some examples, aspects of the operations of 1410 may be performed by an PTRS port component 730 as described with reference to FIG. 7.

At 1415, the method may include receiving the one or more private messages using the first PTRS port and the one or more common messages using the second PTRS port. The operations of 1415 may be performed in accordance with examples as disclosed herein. In some examples, aspects of the operations of 1415 may be performed by a message reception component 735 as described with reference to FIG. 7.

At 1420, the method may include receiving, with the one or more common messages, a PTRS using the second PTRS port. The operations of 1420 may be performed in accordance with examples as disclosed herein. In some examples, aspects of the operations of 1420 may be performed by an PTRS signal component 740 as described with reference to FIG. 7.

Figure 15:
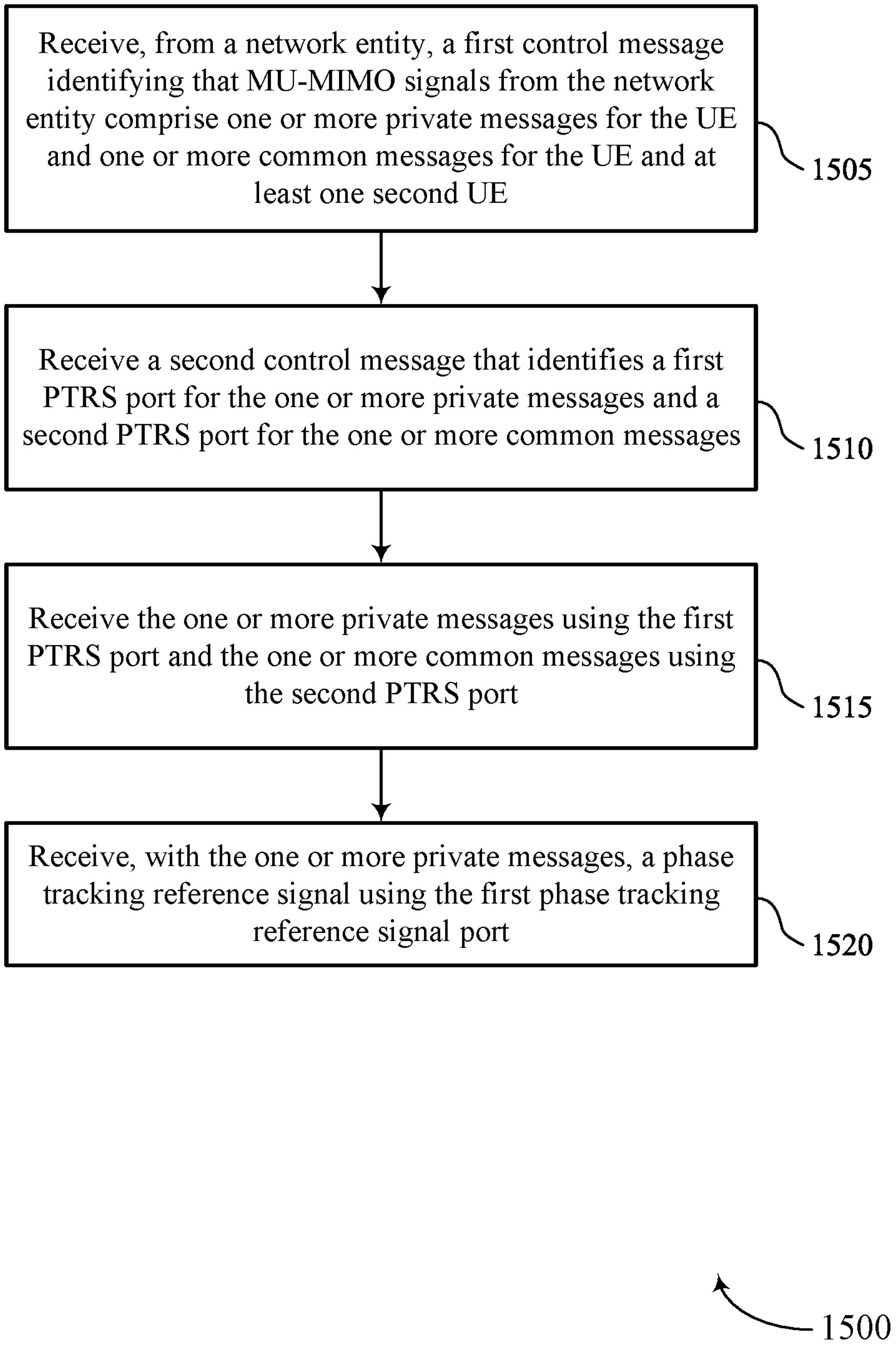

FIG. 15 shows a flowchart illustrating a method 1500 that supports PTRS configuration for rate-splitting MIMO communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a network node, a first control message identifying that MU-MIMO signals from the network node include one or more private messages for the UE and one or more common messages for the UE and at least one second UE. The operations of 1505 may be performed in accordance with examples as disclosed herein. In some examples, aspects of the operations of 1505 may be performed by a rate-splitting component 725 as described with reference to FIG. 7.

At 1510, the method may include receiving a second control message that identifies a first PTRS port for the one or more private messages and a second PTRS port for the one or more common messages. The operations of 1510 may be performed in accordance with examples as disclosed herein. In some examples, aspects of the operations of 1510 may be performed by an PTRS port component 730 as described with reference to FIG. 7.

At 1515, the method may include receiving the one or more private messages using the first PTRS port and the one or more common messages using the second PTRS port. The operations of 1515 may be performed in accordance with examples as disclosed herein. In some examples, aspects of the operations of 1515 may be performed by a message reception component 735 as described with reference to FIG. 7.

At 1520, the method may include receiving, with the one or more private messages, a PTRS using the first PTRS port. The operations of 1520 may be performed in accordance with examples as disclosed herein. In some examples, aspects of the operations of 1520 may be performed by an PTRS signal component 740 as described with reference to FIG. 7.

Figure 16:
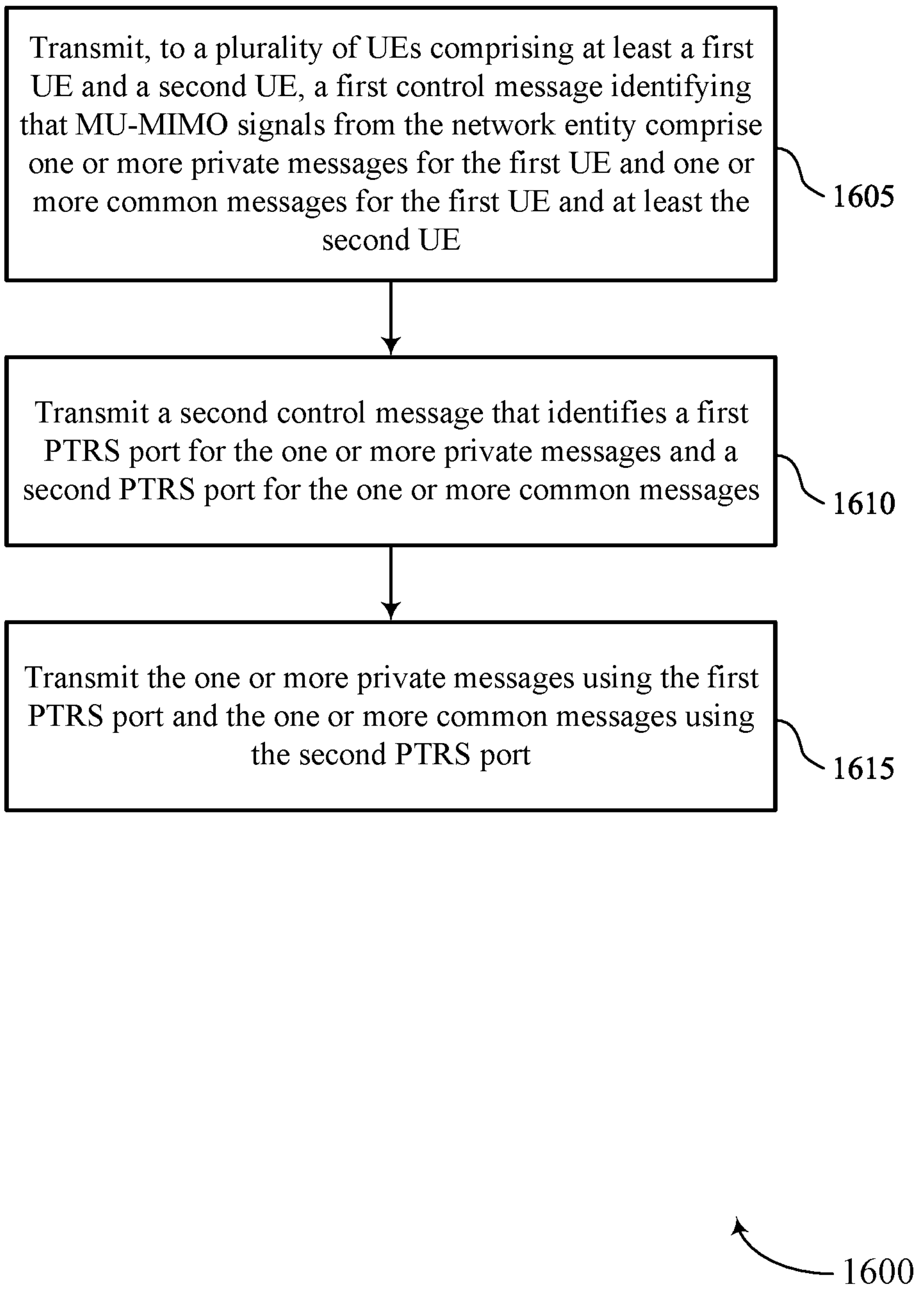

FIG. 16 shows a flowchart illustrating a method 1600 that supports PTRS configuration for rate-splitting MIMO communications in accordance with one or more aspects of the present disclosure. The operations of the method 1600 may be implemented by a network node or its components as described herein. For example, the operations of the method 1600 may be performed by a network node as described with reference to FIGS. 1 through 4 and 9 through 12. In some examples, a network node may execute a set of instructions to control the functional elements of the network node to perform the described functions. Additionally, or alternatively, the network node may perform aspects of the described functions using special-purpose hardware.

At 1605, the method may include transmitting, to a set of multiple UEs including at least a first UE and a second UE, a first control message identifying that MU-MIMO signals from the network node include one or more private messages for the first UE and one or more common messages for the first UE and at least the second UE. The operations of 1605 may be performed in accordance with examples as disclosed herein. In some examples, aspects of the operations of 1605 may be performed by a rate-spitting manager 1125 as described with reference to FIG. 11.

At 1610, the method may include transmitting a second control message that identifies a first PTRS port for the one or more private messages and a second PTRS port for the one or more common messages. The operations of 1610 may be performed in accordance with examples as disclosed herein. In some examples, aspects of the operations of 1610 may be performed by an PTRS port manager 1130 as described with reference to FIG. 11.

At 1615, the method may include transmitting the one or more private messages using the first PTRS port and the one or more common messages using the second PTRS port. The operations of 1615 may be performed in accordance with examples as disclosed herein. In some examples, aspects of the operations of 1615 may be performed by a message reception manager 1135 as described with reference to FIG. 11.

Figure 17:
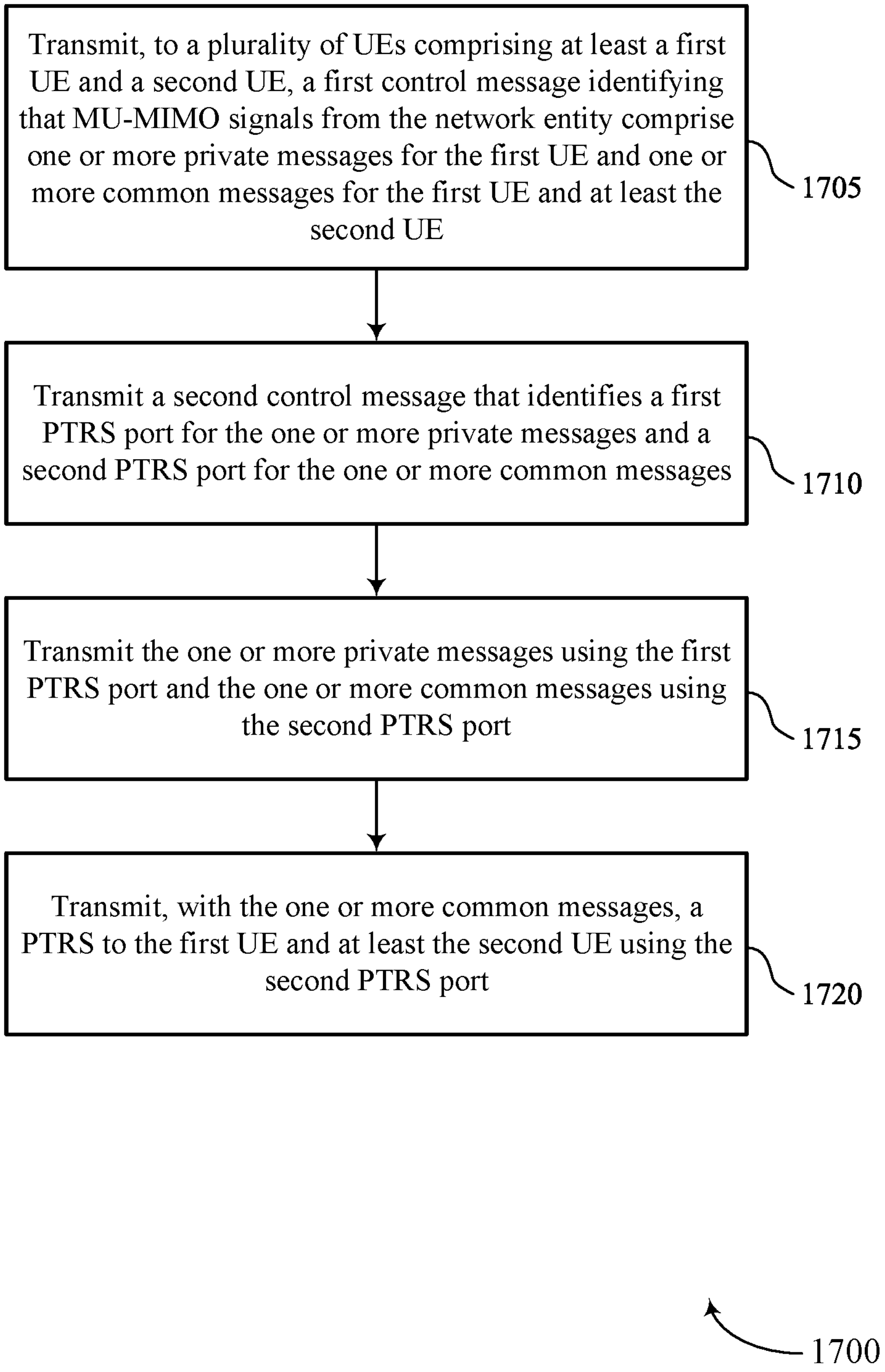

FIG. 17 shows a flowchart illustrating a method 1700 that supports PTRS configuration for rate-splitting MIMO communications in accordance with one or more aspects of the present disclosure. The operations of the method 1700 may be implemented by a network node or its components as described herein. For example, the operations of the method 1700 may be performed by a network node as described with reference to FIGS. 1 through 4 and 9 through 12. In some examples, a network node may execute a set of instructions to control the functional elements of the network node to perform the described functions. Additionally, or alternatively, the network node may perform aspects of the described functions using special-purpose hardware.

At 1705, the method may include transmitting, to a set of multiple UEs including at least a first UE and a second UE, a first control message identifying that MU-MIMO signals from the network node include one or more private messages for the first UE and one or more common messages for the first UE and at least the second UE. The operations of 1705 may be performed in accordance with examples as disclosed herein. In some examples, aspects of the operations of 1705 may be performed by a rate-spitting manager 1125 as described with reference to FIG. 11.

At 1710, the method may include transmitting a second control message that identifies a first PTRS port for the one or more private messages and a second PTRS port for the one or more common messages. The operations of 1710 may be performed in accordance with examples as disclosed herein. In some examples, aspects of the operations of 1710 may be performed by an PTRS port manager 1130 as described with reference to FIG. 11.

At 1715, the method may include transmitting the one or more private messages using the first PTRS port and the one or more common messages using the second PTRS port. The operations of 1715 may be performed in accordance with examples as disclosed herein. In some examples, aspects of the operations of 1715 may be performed by a message reception manager 1135 as described with reference to FIG. 11.

At 1720, the method may include transmitting, with the one or more common messages, a PTRS to the first UE and at least the second UE using the second PTRS port. The operations of 1720 may be performed in accordance with examples as disclosed herein. In some examples, aspects of the operations of 1720 may be performed by an PTRS signal manager 1140 as described with reference to FIG. 11.

Figure 18:
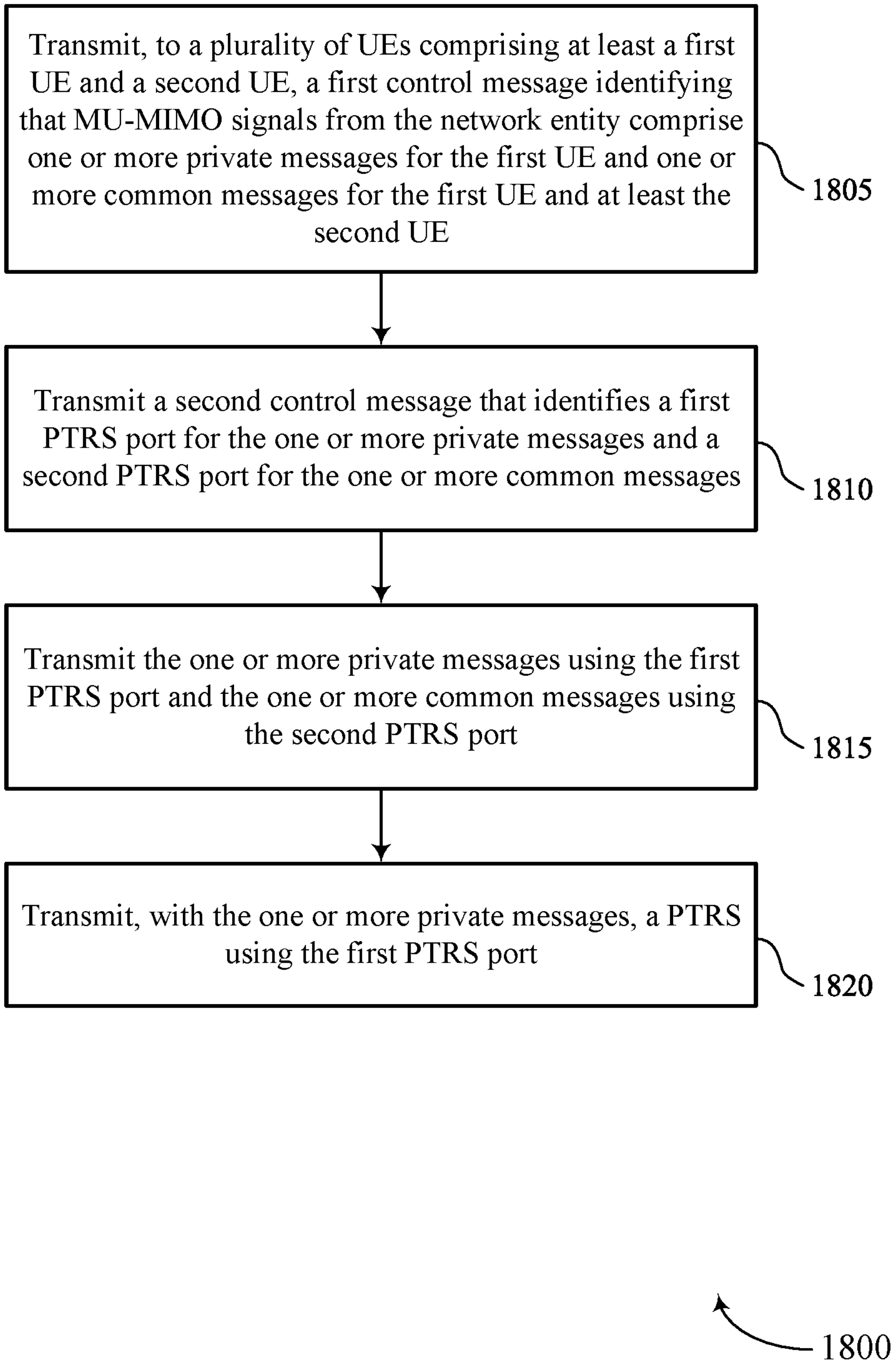

FIG. 18 shows a flowchart illustrating a method 1800 that supports PTRS configuration for rate-splitting MIMO communications in accordance with one or more aspects of the present disclosure. The operations of the method 1800 may be implemented by a network node or its components as described herein. For example, the operations of the method 1800 may be performed by a network node as described with reference to FIGS. 1 through 4 and 9 through 12. In some examples, a network node may execute a set of instructions to control the functional elements of the network node to perform the described functions. Additionally, or alternatively, the network node may perform aspects of the described functions using special-purpose hardware.

At 1805, the method may include transmitting, to a set of multiple UEs including at least a first UE and a second UE, a first control message identifying that MU-MIMO signals from the network node include one or more private messages for the first UE and one or more common messages for the first UE and at least the second UE. The operations of 1805 may be performed in accordance with examples as disclosed herein. In some examples, aspects of the operations of 1805 may be performed by a rate-spitting manager 1125 as described with reference to FIG. 11.

At 1810, the method may include transmitting a second control message that identifies a first PTRS port for the one or more private messages and a second PTRS port for the one or more common messages. The operations of 1810 may be performed in accordance with examples as disclosed herein. In some examples, aspects of the operations of 1810 may be performed by an PTRS port manager 1130 as described with reference to FIG. 11.

At 1815, the method may include transmitting the one or more private messages using the first PTRS port and the one or more common messages using the second PTRS port. The operations of 1815 may be performed in accordance with examples as disclosed herein. In some examples, aspects of the operations of 1815 may be performed by a message reception manager 1135 as described with reference to FIG. 11.

At 1820, the method may include transmitting, with the one or more private messages, a PTRS using the first PTRS port. The operations of 1820 may be performed in accordance with examples as disclosed herein. In some examples, aspects of the operations of 1820 may be performed by an PTRS signal manager 1140 as described with reference to FIG. 11.

The following provides an overview of aspects of the present disclosure:

Aspect 1: A method for wireless communication at a UE, comprising: receiving, from a network entity, a first control message identifying that multi-user multiple input multiple output signals from the network entity comprise one or more private messages for the UE and one or more common messages for the UE and at least one second UE; receiving a second control message that identifies a first phase tracking reference signal port for the one or more private messages and a second phase tracking reference signal port for the one or more common messages; and receiving the one or more private messages using the first phase tracking reference signal port and the one or more common messages using the second phase tracking reference signal port.

Aspect 2: The method of aspect 1, further comprising: receiving, with the one or more common messages, a phase tracking reference signal using the second phase tracking reference signal port.

Aspect 3: The method of aspect 1, further comprising: receiving, with the one or more private messages, a phase tracking reference signal using the first phase tracking reference signal port.

Aspect 4: The method of any of aspects 1 through 3, wherein receiving the second control message comprises: receiving an indication that the first phase tracking reference signal port is private for the UE, the second phase tracking reference signal port is to be shared between the UE and the at least one second UE, or both.

Aspect 5: The method of any of aspects 1 through 3, wherein receiving the second control message comprises: receiving an indication that the first phase tracking reference signal port is shared between the UE and the at least one second UE.

Aspect 6: The method of aspect 5, wherein a precoder associated with the one or more private messages corresponds to the UE.

Aspect 7: The method of any of aspects 1 through 6, wherein receiving the second control message comprises: receiving an indication that the first phase tracking reference signal port is associated with a lowest demodulation reference signal port index of a first plurality of demodulation reference signal port indices corresponding to the one or more private messages; and identifying the first phase tracking reference signal port based at least in part on the lowest demodulation reference signal port index.

Aspect 8: The method of aspect 7, wherein the first plurality of demodulation reference signal port indices corresponding to the one or more private messages have first values that are less than second values of a second plurality of demodulation reference signal port indices corresponding to the one or more common messages.

Aspect 9: The method of any of aspects 1 through 8, further comprising: receiving a third control message indicating a phase tracking reference signal density in a time-domain, a phase tracking reference signal density in a frequency-domain, a resource block offset of a frequency allocation, a resource element offset of the frequency allocation, a modulation and coding scheme of one or more phase tracking reference signals, a plurality of resource elements for receiving the one or more phase tracking reference signals, or any combination thereof.

Aspect 10: The method of any of aspects 1 through 9, further comprising: receiving a third control message indicating a plurality of resource elements scheduled for one or more phase tracking reference signal transmissions to the at least one second UE and using the second phase tracking reference signal port; and refraining from transmitting data using the plurality of resource elements based at least in part on receiving the third control message.

Aspect 11: The method of aspect 10, further comprising: receiving a fourth control message indicating one or more rate matching patterns based at least in part on a phase tracking reference signal density in a time-domain, wherein the third control message comprises a downlink control information message and the fourth control message comprises radio resource control signaling; and transmitting the data according to at least one rate matching pattern of the one or more rate matching patterns based at least in part on the fourth control message.

Aspect 12: A method for wireless communication at a network entity, comprising: transmitting, to a plurality of UEs comprising at least a first UE and a second UE, a first control message identifying that multi-user multiple input multiple output signals from the network entity comprise one or more private messages for the first UE and one or more common messages for the first UE and at least the second UE; transmitting a second control message that identifies a first phase tracking reference signal port for the one or more private messages and a second phase tracking reference signal port for the one or more common messages; and transmitting the one or more private messages using the first phase tracking reference signal port and the one or more common messages using the second phase tracking reference signal port.

Aspect 13: The method of aspect 12, further comprising: transmitting, with the one or more common messages, a phase tracking reference signal to the first UE and at least the second UE using the second phase tracking reference signal port.

Aspect 14: The method of aspect 13, further comprising: transmitting a third control message to at least the second UE indicating a rate matching pattern for receiving the phase tracking reference signal.

Aspect 15: The method of any of aspects 13 through 14, wherein the one or more common messages comprise a data transmission associated with at least the second UE.

Aspect 16: The method of any of aspects 12 through 15, further comprising: transmitting, with the one or more private messages, a phase tracking reference signal using the first phase tracking reference signal port.

Aspect 17: The method of any of aspects 12 through 16, wherein transmitting the second control message comprises: transmitting an indication that the first phase tracking reference signal port is private for the first UE, the second phase tracking reference signal port is to be shared between the first UE and at least the second UE, or both.

Aspect 18: The method of any of aspects 12 through 16, wherein transmitting the second control message comprises: transmitting an indication that the first phase tracking reference signal port is shared between the first UE and at least the second UE.

Aspect 19: The method of aspect 18, wherein a precoder associated with the one or more private messages corresponds to the first UE.

Aspect 20: The method of any of aspects 12 through 19, wherein transmitting the second control message comprises: transmitting an indication that the first phase tracking reference signal port is associated with a lowest demodulation reference signal port index of a first plurality of demodulation reference signal port indices corresponding to the one or more private messages.

Aspect 21: The method of aspect 20, wherein the first plurality of demodulation reference signal port indices corresponding to the one or more private messages have first values that are less than second values of a second plurality of demodulation reference signal port indices corresponding to the one or more common messages.

Aspect 22: The method of any of aspects 12 through 21, further comprising: transmitting a third control message indicating a phase tracking reference signal density in a time-domain, a phase tracking reference signal density in a frequency-domain, a resource block offset of a frequency allocation, a resource element offset of the frequency allocation, a modulation and coding scheme of one or more phase tracking reference signals, a plurality of resource elements for receiving the one or more phase tracking reference signals, or any combination thereof.

Aspect 23: The method of any of aspects 12 through 22, further comprising: transmitting a third control message indicating a plurality of resource elements scheduled for one or more phase tracking reference signal transmissions to at least the second UE and using the second phase tracking reference signal port.

Aspect 24: The method of aspect 23, further comprising: transmitting a fourth control message indicating one or more rate matching patterns based at least in part on a phase tracking reference signal density in a time-domain, wherein the third control message comprises a downlink control information message and the fourth control message comprises radio resource control signaling; and receiving data according to at least one rate matching pattern of the one or more rate matching patterns based at least in part on the fourth control message.

Aspect 25: An apparatus for wireless communication at a UE, comprising a processor; memory coupled with the processor; and instructions stored in the memory and executable by the processor to cause the apparatus to perform a method of any of aspects 1 through 11.

Aspect 26: An apparatus for wireless communication at a UE, comprising at least one means for performing a method of any of aspects 1 through 11.

Aspect 27: A non-transitory computer-readable medium storing code for wireless communication at a UE, the code comprising instructions executable by a processor to perform a method of any of aspects 1 through 11.

Aspect 28: An apparatus for wireless communication at a network entity, comprising a processor; memory coupled with the processor; and instructions stored in the memory and executable by the processor to cause the apparatus to perform a method of any of aspects 12 through 24.

Aspect 29: An apparatus for wireless communication at a network entity, comprising at least one means for performing a method of any of aspects 12 through 24.

Aspect 30: A non-transitory computer-readable medium storing code for wireless communication at a network entity, the code comprising instructions executable by a processor to perform a method of any of aspects 12 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

one or more processors;

memory coupled with the one or more processors; and
instructions stored in the memory and executable by the one or more processors to cause the apparatus to:
receive, from a network node, a first control message identifying that multi-user multiple input multiple output signals from the network node comprise one or more private messages for the UE and one or more common messages for the UE and at least one second UE;
receive a second control message that identifies a first phase tracking reference signal port for the one or more private messages and a second phase tracking reference signal port for the one or more common messages, wherein the second control message indicates that the first phase tracking reference signal port is associated with a lowest demodulation reference signal port index of a first plurality of demodulation reference signal port indices corresponding to the one or more private messages; and
receive the one or more private messages using the first phase tracking reference signal port that is identified based at least in part on the lowest demodulation reference signal port index and the one or more common messages using the second phase tracking reference signal port.

2. The apparatus of claim 1, wherein the instructions are further executable by the one or more processors to cause the apparatus to:
receive, with the one or more common messages, a phase tracking reference signal using the second phase tracking reference signal port.

3. The apparatus of claim 1, wherein the instructions are further executable by the one or more processors to cause the apparatus to:
receive, with the one or more private messages, a phase tracking reference signal using the first phase tracking reference signal port.

4. The apparatus of claim 1, wherein the instructions to receive the second control message are executable by the one or more processors to cause the apparatus to:
receive an indication that the first phase tracking reference signal port is private for the UE, the second phase tracking reference signal port is to be shared between the UE and the at least one second UE, or both.

5. The apparatus of claim 1, wherein the instructions to receive the second control message are executable by the one or more processors to cause the apparatus to:
receive an indication that the first phase tracking reference signal port is shared between the UE and the at least one second UE.

6. The apparatus of claim 5, wherein a first precoder associated with the one or more private messages corresponds to the UE, and the first precoder is different from at least one second precoder corresponding to the at least one second UE.

7. The apparatus of claim 1, wherein the first plurality of demodulation reference signal port indices corresponding to the one or more private messages have first values that are less than second values of a second plurality of demodulation reference signal port indices corresponding to the one or more common messages.

8. The apparatus of claim 1, wherein the instructions are further executable by the one or more processors to cause the apparatus to:
receive a third control message indicating a phase tracking reference signal density in a time-domain, a phase tracking reference signal density in a frequency-domain, a resource block offset of a frequency allocation, a resource element offset of the frequency allocation, a modulation and coding scheme of one or more phase tracking reference signals, a plurality of resource elements for receiving the one or more phase tracking reference signals, or any combination thereof.

9. The apparatus of claim 1, wherein the instructions are further executable by the one or more processors to cause the apparatus to:
receive a third control message indicating a plurality of resource elements scheduled for one or more phase tracking reference signal transmissions to the at least one second UE and using the second phase tracking reference signal port; and
refrain from transmitting data using the plurality of resource elements based at least in part on receiving the third control message.

10. The apparatus of claim 9, wherein the instructions are further executable by the one or more processors to cause the apparatus to:
receive a fourth control message indicating one or more rate matching patterns based at least in part on a phase tracking reference signal density in a time-domain, wherein the third control message comprises a downlink control information message and the fourth control message comprises radio resource control signaling; and
transmit the data according to at least one rate matching pattern of the one or more rate matching patterns based at least in part on the fourth control message.

11. An apparatus for wireless communication at a network node, comprising:
one or more processors;
memory coupled with the one or more processors; and
instructions stored in the memory and executable by the one or more processors to cause the apparatus to:
transmit, to a plurality of UEs comprising at least a first UE and a second UE, a first control message identifying that multi-user multiple input multiple output signals from the network node comprise one or more private messages for the first UE and one or more common messages for the first UE and at least the second UE;
transmit a second control message that identifies a first phase tracking reference signal port for the one or more private messages and a second phase tracking reference signal port for the one or more common messages, wherein the second control message indicates that the first phase tracking reference signal port is associated with a lowest demodulation reference signal port index of a first plurality of demodulation reference signal port indices corresponding to the one or more private messages; and
transmit the one or more private messages using the first phase tracking reference signal port that is based at least in part on the lowest demodulation reference signal port index and the one or more common messages using the second phase tracking reference signal port.

12. The apparatus of claim 11, wherein the instructions are further executable by the one or more processors to cause the apparatus to:
transmit, with the one or more common messages, a phase tracking reference signal to the first UE and at least the second UE using the second phase tracking reference signal port.

13. The apparatus of claim 12, wherein the instructions are further executable by the one or more processors to cause the apparatus to:

transmit a third control message to at least the second UE indicating a rate matching pattern for receiving the phase tracking reference signal.

14. The apparatus of claim 12, wherein the one or more common messages comprise a data transmission associated with at least the second UE.

15. The apparatus of claim 11, wherein the instructions are further executable by the one or more processors to cause the apparatus to:

transmit, with the one or more private messages, a phase tracking reference signal using the first phase tracking reference signal port.

16. The apparatus of claim 11, wherein the instructions to transmit the second control message are executable by the one or more processors to cause the apparatus to:

transmit an indication that the first phase tracking reference signal port is private for the first UE, the second phase tracking reference signal port is to be shared between the first UE and at least the second UE, or both.

17. The apparatus of claim 11, wherein the instructions to transmit the second control message are executable by the one or more processors to cause the apparatus to:

transmit an indication that the first phase tracking reference signal port is shared between the first UE and at least the second UE.

18. The apparatus of claim 17, wherein a precoder associated with the one or more private messages corresponds to the first UE.

19. The apparatus of claim 1, wherein the first plurality of demodulation reference signal port indices corresponding to the one or more private messages have first values that are less than second values of a second plurality of demodulation reference signal port indices corresponding to the one or more common messages.

20. The apparatus of claim 11, wherein the instructions are further executable by the one or more processors to cause the apparatus to:

transmit a third control message indicating a phase tracking reference signal density in a time-domain, a phase tracking reference signal density in a frequency-domain, a resource block offset of a frequency allocation, a resource element offset of the frequency allocation, a modulation and coding scheme of one or more phase tracking reference signals, a plurality of resource elements for receiving the one or more phase tracking reference signals, or any combination thereof.

21. The apparatus of claim 11, wherein the instructions are further executable by the one or more processors to cause the apparatus to:

transmit a third control message indicating a plurality of resource elements scheduled for one or more phase tracking reference signal transmissions to at least the second UE and using the second phase tracking reference signal port.

22. The apparatus of claim 21, wherein the instructions are further executable by the one or more processors to cause the apparatus to:

transmit a fourth control message indicating one or more rate matching patterns based at least in part on a phase tracking reference signal density in a time-domain, wherein the third control message comprises a downlink control information message and the fourth control message comprises radio resource control signaling; and receive data according to at least one rate matching pattern of the one or more rate matching patterns based at least in part on the fourth control message.

23. A method for wireless communication at a user equipment (UE), comprising:

receiving, from a network node, a first control message identifying that multi-user multiple input multiple output signals from the network node comprise one or more private messages for the UE and one or more common messages for the UE and at least one second UE;

receiving a second control message that identifies a first phase tracking reference signal port for the one or more private messages and a second phase tracking reference signal port for the one or more common messages, wherein the second control message indicates that the first phase tracking reference signal port is associated with a lowest demodulation reference signal port index of a first plurality of demodulation reference signal port indices corresponding to the one or more private messages; and receiving the one or more private messages using the first phase tracking reference signal port that is identified based at least in part on the lowest demodulation reference signal port index and the one or more common messages using the second phase tracking reference signal port.

24. The method of claim 23, further comprising:

receiving, with the one or more common messages, a phase tracking reference signal using the second phase tracking reference signal port.

25. The method of claim 23, further comprising:

receiving, with the one or more private messages, a phase tracking reference signal using the first phase tracking reference signal port.

26. The method of claim 23, wherein receiving the second control message comprises:

receiving an indication that the first phase tracking reference signal port is private for the UE, the second phase tracking reference signal port is to be shared between the UE and the at least one second UE, or both.

27. The method of claim 23, wherein receiving the second control message comprises:

receiving an indication that the first phase tracking reference signal port is shared between the UE and the at least one second UE.

28. A method for wireless communication at a network node, comprising:

transmitting, to a plurality of UEs comprising at least a first UE and a second UE, a first control message identifying that multi-user multiple input multiple output signals from the network node comprise one or more private messages for the first UE and one or more common messages for the first UE and at least the second UE;

transmitting a second control message that identifies a first phase tracking reference signal port for the one or more private messages and a second phase tracking reference signal port for the one or more common messages, wherein the second control message indicates that the first phase tracking reference signal port is associated with a lowest demodulation reference signal port index of a first plurality of demodulation reference signal port indices corresponding to the one or more private messages; and transmitting the one or more private messages using the first phase tracking reference signal port that is identified based at least in part on the lowest demodulation reference signal port index and the one or more common messages using the second phase tracking reference signal port.

* * * * *